United States Patent
Chen et al.

(10) Patent No.: US 10,310,230 B2
(45) Date of Patent: Jun. 4, 2019

(54) PHOTOGRAPHING LENS SYSTEM, IMAGE CAPTURING UNIT AND ELECTRONIC DEVICE

(71) Applicant: LARGAN Precision Co., Ltd., Taichung (TW)

(72) Inventors: Hung-Shuo Chen, Taichung (TW); Hsin-Hsuan Huang, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/711,770

(22) Filed: Sep. 21, 2017

(65) Prior Publication Data

US 2018/0335610 A1 Nov. 22, 2018

(30) Foreign Application Priority Data

May 19, 2017 (TW) .............................. 106116743 A

(51) Int. Cl.
*G02B 9/60* (2006.01)
*G02B 13/18* (2006.01)
*G02B 13/00* (2006.01)
*G02B 27/00* (2006.01)

(52) U.S. Cl.
CPC ........... *G02B 13/0045* (2013.01); *G02B 9/60* (2013.01); *G02B 13/18* (2013.01); *G02B 27/0025* (2013.01)

(58) Field of Classification Search
CPC ...... G02B 13/0045; G02B 9/60; G02B 13/18; G02B 27/0025
USPC ................................................ 359/708, 714
See application file for complete search history.

(56) References Cited

U.S. PATENT DOCUMENTS

| | | | |
|---|---|---|---|
| 2,596,799 | A | 5/1952 | Tillyer et al. |
| 4,124,276 | A | 11/1978 | Okano et al. |
| 4,324,458 | A | 4/1982 | Sato |
| 4,740,067 | A | 4/1988 | Ueda |
| 4,757,354 | A | 7/1988 | Sato et al. |
| 4,832,465 | A | 5/1989 | Arai et al. |
| 7,880,981 | B2 | 2/2011 | Do |
| 9,341,820 | B2 | 5/2016 | Chen et al. |
| 2014/0293452 | A1 | 10/2014 | Kanda et al. |
| 2016/0238821 | A1 | 8/2016 | Liao et al. |
| 2016/0259147 | A1 | 9/2016 | Hsueh et al. |

(Continued)

FOREIGN PATENT DOCUMENTS

| CN | 105445902 | | 3/2016 |
|---|---|---|---|
| CN | 105445902 | A * | 3/2016 |

(Continued)

OTHER PUBLICATIONS

Taiwan Intellectual Property Office, Office Action issued in connection with Taiwan Application No. 106116743, dated Feb. 12, 2018, 10 pages.

*Primary Examiner* — James R Greece
(74) *Attorney, Agent, or Firm* — Hanley, Flight & Zimmerman, LLC

(57) ABSTRACT

A photographing lens system includes five lens elements which are, in order from an object side to an image side: a first lens element, a second lens element, a third lens element, a fourth lens element and a fifth lens element. The first lens element has positive refractive power. The third lens element has an object-side surface being convex in a paraxial region thereof. The fourth lens element has an object-side surface being convex in a paraxial region thereof.

30 Claims, 26 Drawing Sheets

(56) References Cited

U.S. PATENT DOCUMENTS

2016/0320589 A1 11/2016 Liao et al.
2018/0188501 A1 7/2018 Lee et al.

FOREIGN PATENT DOCUMENTS

| CN | 106291883 | 1/2017 |
|---|---|---|
| JP | S5334522 A | 3/1978 |
| JP | S59229516 A | 12/1984 |
| JP | S6023814 A | 2/1985 |
| JP | S6239811 A | 2/1987 |
| JP | S62200315 A | 9/1987 |
| JP | S62203119 A | 9/1987 |
| JP | H04333813 A | 11/1992 |
| TW | M483431 | 8/2014 |
| TW | 201631352 | 9/2016 |
| TW | 201638626 | 11/2016 |

* cited by examiner

PHOTOGRAPHING LENS SYSTEM, IMAGE CAPTURING UNIT AND ELECTRONIC DEVICE

RELATED APPLICATIONS

This application claims priority under 35 U.S.C. § 119 to Taiwan Application 106116743, filed May 19, 2017, which is incorporated by reference herein in its entirety.

BACKGROUND

Technical Field

The present disclosure relates to a photographing lens system, an image capturing unit and an electronic device, more particularly to a photographing lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

In order to provide better user experience, the electronic device equipped with one or more optical systems has become the mainstream product in the market. For various applications, the optical systems are developed with various optical characteristics, and have been widely applied to different kinds of smart electronic devices, such as vehicle devices, image recognition systems, entertainment devices, sport devices and intelligent home assistance systems, for various requirements.

However, lens elements used in a conventional optical system are usually made of glass and have spherical lens surfaces, such that it is difficult to reduce the size of the conventional optical system. Furthermore, due to difficulty of reducing the size of the conventional optical system, an electronic device equipped with the conventional optical system would be large as well. Therefore, it is unfavorable for utilization on a compact portable electronic device. Furthermore, the camera angle of the conventional optical system is not suitable to capture long shot images with high resolution, so that the conventional optical system is already incapable of meeting the requirements of the current technology trends. Accordingly, there is a need to develop an optical system meeting the requirements of telephoto, compact size and high image quality simultaneously.

SUMMARY

According to one aspect of the present disclosure, a photographing lens system includes five lens elements. The five lens elements are, in order from an object side to an image side, a first lens element, a second lens element, a third lens element, a fourth lens element and a fifth lens element. The first lens element has positive refractive power. The third lens element has an object-side surface being convex in a paraxial region thereof. The fourth lens element has an object-side surface being convex in a paraxial region thereof. When a refractive power of the first lens element is P1, a refractive power of the second lens element is P2, a refractive power of the third lens element is P3, a refractive power of the fourth lens element is P4, a refractive power of the fifth lens element is P5, an axial distance between the second lens element and the third lens element is T23, an axial distance between the third lens element and the fourth lens element is T34, an axial distance between the fourth lens element and the fifth lens element is T45, a central thickness of the second lens element is CT2, and a central thickness of the fourth lens element is CT4, the following conditions are satisfied:

$$(|P3|+|P4|+|P5|)/(|P1|+|P2|)<0.60;$$

$$3.50<|P1|+|P2|<8.50;$$

$$0.20<(T34/T45)+(T45/CT4)<1.50; \text{ and}$$

$$0.10<(CT2+T34)/T23<9.0.$$

According to another aspect of the present disclosure, a photographing lens system includes five lens elements. The five lens elements are, in order from an object side to an image side, a first lens element, a second lens element, a third lens element, a fourth lens element and a fifth lens element. The first lens element has positive refractive power. The third lens element has an object-side surface being convex in a paraxial region thereof. The fourth lens element has an object-side surface being convex in a paraxial region thereof. The fifth lens element has an image-side surface being concave in a paraxial region thereof. At least one of the five lens elements has at least one inflection point. When a refractive power of the first lens element is P1, a refractive power of the second lens element is P2, a refractive power of the third lens element is P3, a refractive power of the fourth lens element is P4, a refractive power of the fifth lens element is P5, a central thickness of the second lens element is CT2, and a central thickness of the fourth lens element is CT4, the following conditions are satisfied:

$$(|P3|+|P4|+|P5|)/(|P1|+|P2|)<0.80;$$

$$3.50<|P1|+|P2|<8.50; \text{ and}$$

$$0.03<CT2/CT4<0.58.$$

According to still another aspect of the present disclosure, an image capturing unit includes the aforementioned photographing lens system, a prism, a driving device and an image sensor. Both the prism and the driving device are disposed on the photographing lens system, and the image sensor is disposed on an image surface of the photographing lens system.

According to yet another aspect of the present disclosure, an electronic device includes the aforementioned image capturing unit.

According to yet still another aspect of the present disclosure, a photographing lens system includes five lens elements. The five lens elements are, in order from an object side to an image side, a first lens element, a second lens element, a third lens element, a fourth lens element and a fifth lens element. The first lens element has positive refractive power. The third lens element has an object-side surface being convex in a paraxial region thereof and an image-side surface being concave in a paraxial region thereof. The fourth lens element has positive refractive power. At least one of the five lens elements has at least one inflection point. When a refractive power of the first lens element is P1, a refractive power of the second lens element is P2, a refractive power of the third lens element is P3, a refractive power of the fourth lens element is P4, a refractive power of the fifth lens element is P5, a central thickness of the second lens element is CT2, a central thickness of the third lens element is CT3, a central thickness of the fourth lens element is CT4, and a central thickness of the fifth lens element is CT5, the following conditions are satisfied:

$$(|P3|+|P4|+|P5|)/(|P1|+|P2|)<0.60;\text{ and}$$

$$1.80<(CT3+CT4)/(CT2+CT5)<7.0.$$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
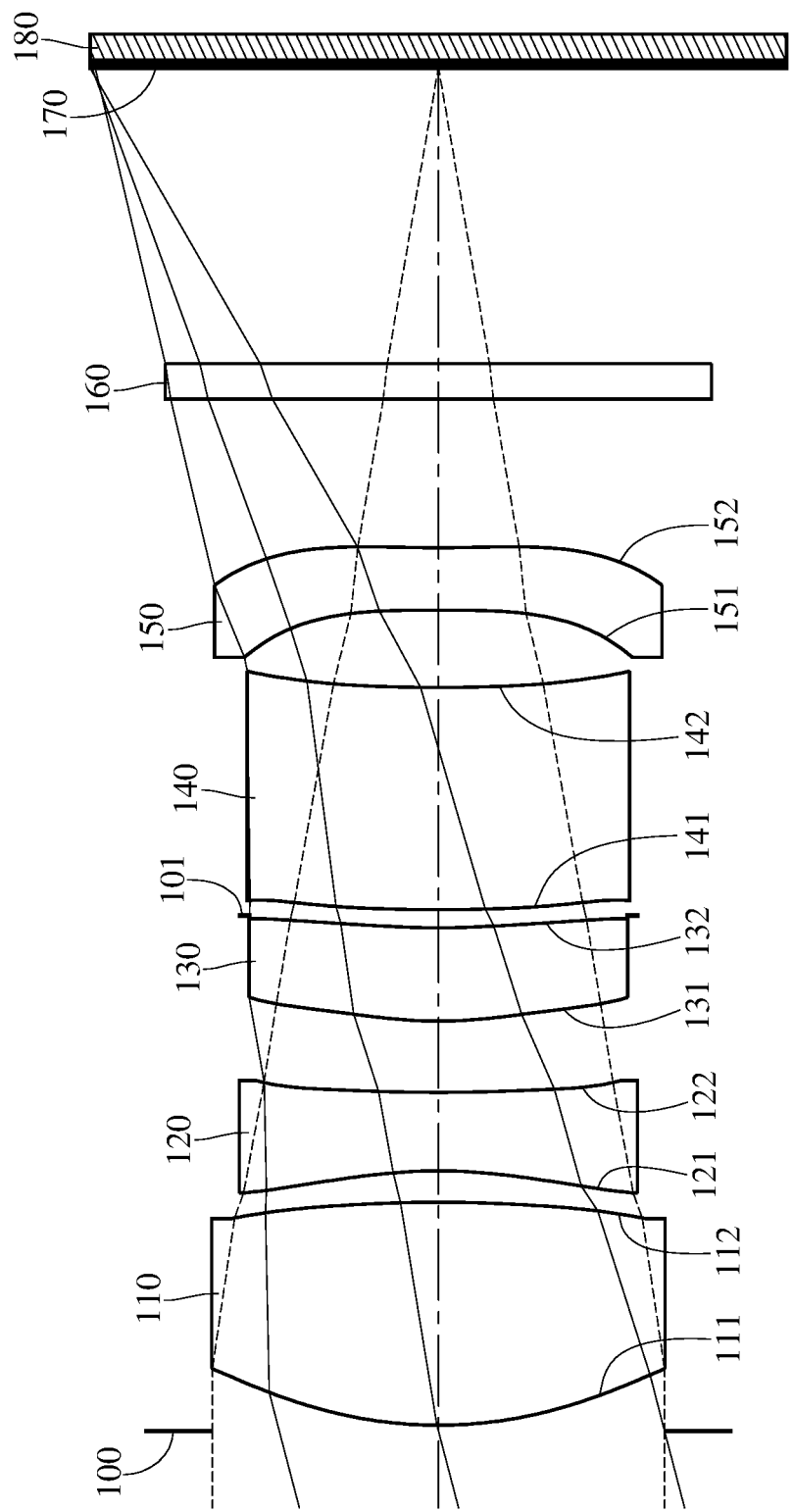
FIG. 1 is a schematic view of an image capturing unit according to the 1st embodiment of the present disclosure.

A photographing lens system includes, in order from an object side to an image side, a first lens element, a second lens element, a third lens element, a fourth lens element and a fifth lens element.

There can be an air gap in a paraxial region between each adjacent lens element of the five lens elements of the photographing lens system; that is, each of the first through the fifth lens elements can be a single and non-cemented lens element. The manufacturing process of the cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to displacement and it is thereby not favorable for the image quality. Therefore, having an air gap in a paraxial region between each of the five adjacent lens elements in the present disclosure is favorable for properly arranging the spacing of the lens elements so that the photographing lens system is more flexible to design, and thus it is favorable for correcting aberrations.

The first lens element has positive refractive power. Therefore, it is favorable for providing sufficient light convergence capability so as to obtain a telephoto configuration; furthermore, it is favorable for reducing a total track length of the photographing lens system so as to prevent assembling problems.

The second lens element can have negative refractive power; therefore, it is favorable for correcting aberrations generated by the first lens element and for correcting chromatic aberration so as to prevent image overlap due to light rays with different wavelengths focusing on different positions. The second lens element can have an object-side surface being concave in a paraxial region thereof; therefore, it is favorable for reducing the angle of incidence so as to prevent total reflection, thereby eliminating stray light.

The third lens element can have positive refractive power; therefore, it is favorable for distributing the light convergence capability with the first lens element so as to correct aberrations, thereby improving image quality. The third lens element has an object-side surface being convex in a paraxial region thereof; therefore, a shape of the object-side surface of the third lens element is favorable for enhancing the capability to correct aberrations so as to further improve image quality. The third lens element can have an image-side surface being concave in a paraxial region thereof; therefore, it is favorable for controlling the light path so as to prevent the outer diameter of the fourth lens element from overly large, thereby keeping the photographing lens system compact.

The fourth lens element can have positive refractive power; therefore, it is favorable for moving the principal point of the photographing lens system towards the image side so as to provide a sufficient back focal length, and thus the configuration of the photographing lens system is more flexible to design. The fourth lens element can have an object-side surface being convex in a paraxial region thereof; therefore, it is favorable for reducing the incident angle of light projecting onto the image surface so as to prevent vignetting at the periphery of the image. The fourth lens element can have an image-side surface being concave in a paraxial region thereof; therefore, it is favorable for controlling the back focal length in coordination with the fifth lens element so as to keep the photographing lens system as well as an electronic device equipped with the photographing lens system compact.

The fifth lens element can have an image-side surface being concave in a paraxial region thereof. Therefore, it is favorable for reducing the back focal length so as to achieve compactness.

Figure 23:
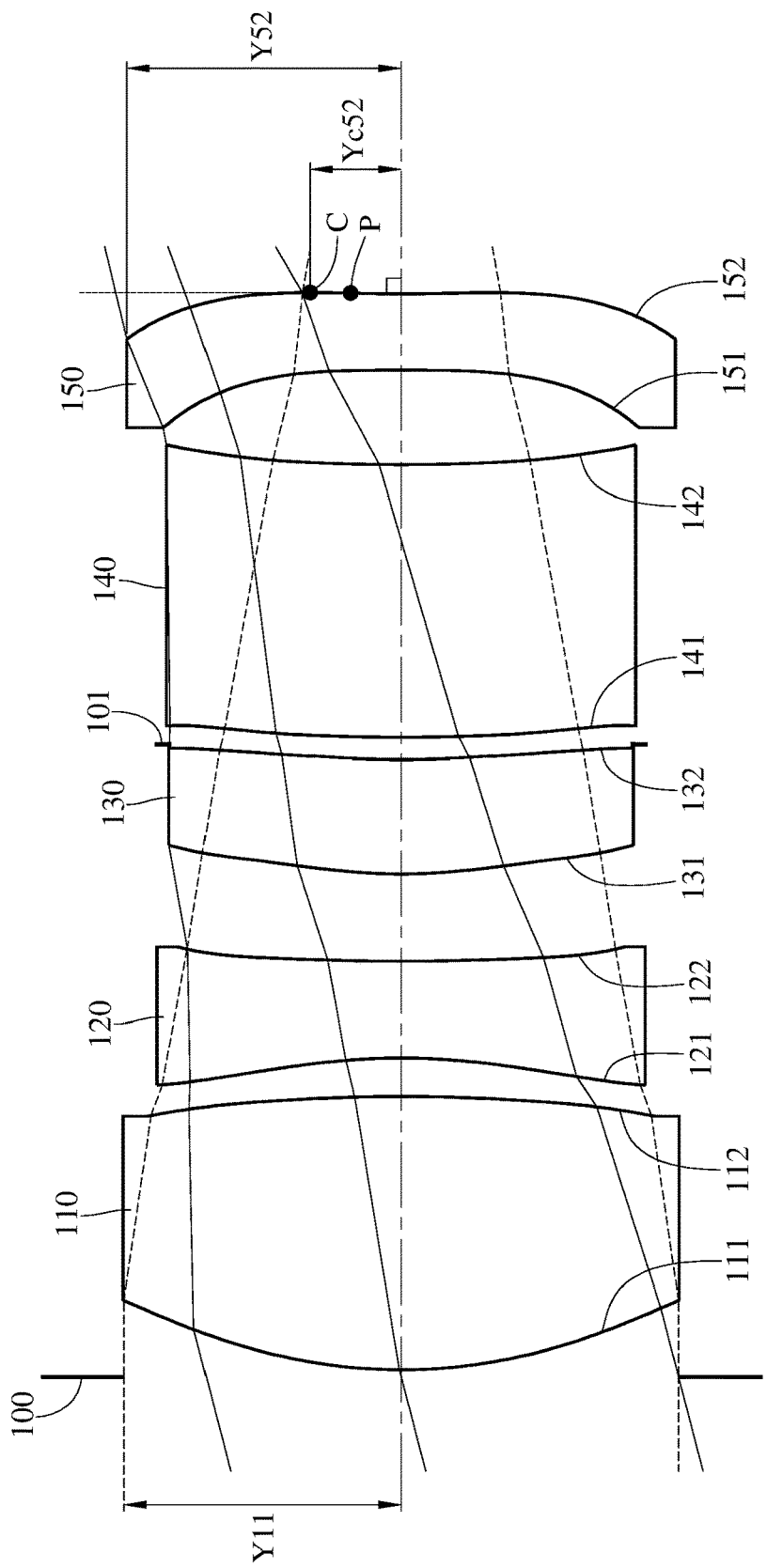
FIG. 23 shows a schematic view of Y11, Y52, and Yc52 with both a critical point and an inflection point on the fifth lens element, according to the 1st embodiment of the present disclosure.

According to the present disclosure, among the five lens elements, there can be at least one lens element having at least one inflection point. In detail, among the first through the fifth lens elements, there can be one or more lens elements with each having at least one inflection point. When a single lens element has at least one inflection point, at least one of the object-side surface and the image-side surface of this lens element has at least one inflection point. Therefore, it is favorable for correcting off-axis aberrations, such as coma and astigmatism, as well as reducing distortion, thereby preventing vignetting at the periphery of the image. FIG. 23 shows a schematic view of an inflection point on the fifth lens element according to the 1st embodiment of the present disclosure, wherein the image-side surface of the fifth lens element has at least one inflection point P.

When a refractive power of the first lens element is P1, a refractive power of the second lens element is P2, a refractive power of the third lens element is P3, a refractive power of the fourth lens element is P4, and a refractive power of the fifth lens element is P5, the following condition is satisfied: (|P3|+|P4|+|P5|)/(|P1|+|P2|)<0.80. Therefore, it is favorable for strengthening the refractive power of the first lens element and the second lens element so as to obtain a telephoto configuration; furthermore, it is favorable for a proper refractive power distribution of the photographing lens system so that the third through the fifth lens elements are configured as three correction lenses for correcting aberrations, thereby improving image quality. Preferably, the following condition can be satisfied: (|P3|+|P4|+|P5|)/(|P1|+|P2|)<0.70. More preferably, the following condition can also be satisfied: (|P3|+|P4|+|P5|)/(|P1|+|P2|)<0.60. According to the present disclosure, a refractive power of a lens element is a ratio of a focal length of the photographing lens system to a focal length of this lens element.

When the refractive power of the first lens element is P1, and the refractive power of the second lens element is P2, the following condition can be satisfied: 3.50<|P1|+|P2|<8.50. Therefore, it is favorable for the first lens element and the second lens element having sufficient capability to control the light path so as to be able to capture long shot images with high resolution. Preferably, the following condition can be satisfied: 4.0<|P1|+|P2|<7.50. More preferably, the following condition can also be satisfied: 5.0<|P1|+|P2|<7.0.

When an axial distance between the third lens element and the fourth lens element is T34, an axial distance between the fourth lens element and the fifth lens element is T45, and a central thickness of the fourth lens element is CT4, the following condition can be satisfied: 0.20<(T34/T45)+(T45/CT4)<1.50. Therefore, it is favorable for properly arranging the thickness of fourth lens element and the axial distance between two adjacent lens elements so that the space in the photographing lens system is well utilized. Preferably, the following condition can also be satisfied: 0.20<(T34/T45)+(T45/CT4)<0.85.

When a central thickness of the second lens element is CT2, an axial distance between the second lens element and the third lens element is T23, and the axial distance between the third lens element and the fourth lens element is T34, the following condition can be satisfied: 0.10<(CT2+T34)/T23<9.0. Therefore, the arrangement of the lens elements is proper for providing a sufficient axial distance for lens assembling between the second lens element and the third lens element so as to prevent interference between adjacent lens elements during assembling process, thereby achieving better space utilization. Preferably, the following condition can be satisfied: 0.15<(CT2+T34)/T23<5.0. More preferably, the following condition can also be satisfied: 0.20<(CT2+T34)/T23<2.0. When the central thickness of the second lens element is CT2, and the central thickness of the fourth lens element is CT4, the following condition can be satisfied: 0.03<CT2/CT4<0.58. Therefore, it is favorable for the fourth lens element having sufficient central thickness for controlling the light path so as to improve image quality.

When the central thickness of the second lens element is CT2, a central thickness of the third lens element is CT3, the central thickness of the fourth lens element is CT4, and a central thickness of the fifth lens element is CT5, the following condition can be satisfied: 1.0<(CT3+CT4)/(CT2+CT5)<8.0. Therefore, it is favorable for balancing the capability in correcting aberrations of each lens element and increasing the stability of the photographing lens system. Preferably, the following condition can also be satisfied: 1.80<(CT3+CT4)/(CT2+CT5)<7.0.

When a curvature radius of the object-side surface of the third lens element is R5, and a curvature radius of the image-side surface of the third lens element is R6, the following condition can be satisfied: 0.10<R5/R6<1.50. Therefore, it is favorable for light rays on the tangential plane and the sagittal plane converging so as to correct astigmatism.

When a curvature radius of the object-side surface of the fourth lens element is R7, and a curvature radius of the image-side surface of the fourth lens element is R8, the following condition can be satisfied: −0.45<(R7−R8)/(R7+R8)<1.0. Therefore, it is favorable for correcting aberrations by controlling the curvatures and the refractive power of the fourth lens element in accordance with the design and the application of compact devices.

When an Abbe number of the third lens element is V3, and an Abbe number of the fifth lens element is V5, the following condition can be satisfied: 20.0<V3+V5<78.0. Therefore, it is favorable for aberration corrections and light rays with different wavelengths converging onto the image surface. Preferably, the following condition can also be satisfied: 25.0<V3+V5<65.0.

The photographing lens system further includes an aperture stop, and the aperture stop can be disposed between an imaged object and the object-side surface of the second lens element. When an axial distance between the aperture stop and the image-side surface of the fifth lens element is SD, and an axial distance between an object-side surface of the first lens element and the image-side surface of the fifth lens element is TD, the following condition can be satisfied:

$0.75<SD/TD<1.20$. Therefore, it is favorable for balancing the field of view and the total track length by controlling the position of the aperture stop; moreover, it is favorable for obtaining a proper imaging range and reducing the incident angle of light projected onto the image surface so as to prevent vignetting, and thus the photographing lens system is applicable to long shot and is able to be maintained in a compact size.

When an axial distance between the first lens element and the second lens element is T12, and the central thickness of the fourth lens element is CT4, the following condition can be satisfied: $0<T12/CT4<0.50$. Therefore, it is favorable for properly arranging the axial distance between the first lens element and the second lens element so as to reduce the total track length of the photographing lens system; moreover, it is favorable for providing the fourth lens element with sufficient thickness so as to improve the structural strength of the photographing lens system and the manufacturing yield rate.

When an axial distance between the object-side surface of the first lens element and the image surface is TL, and a maximum image height of the photographing lens system is ImgH (half of a diagonal length of an effective photosensitive area of an image sensor), the following condition can be satisfied: $2.50<TL/ImgH<4.50$. Therefore, when taking long shot, it is favorable for obtaining a proper total track length and sufficient image size so as to enhance the image brightness, thereby improving image quality.

When a composite focal length of the first lens element and the second lens element is f12, and a composite focal length of the third lens element, the fourth lens element and the fifth lens element is f345, the following condition can be satisfied: $0<f345/f12<1.80$. Therefore, the refractive power distribution at the object side and the image side is favorable for better balance of aberrations and a shorter total track length in a telephoto configuration.

When the focal length of the photographing lens system is f, and a focal length of the first lens element is f1, the following condition can be satisfied: $1.80<f/f1<3.50$. Therefore, it is favorable for increasing the focusing capability of light rays on the object side so as to obtain the telephoto configuration.

When the focal length of the photographing lens system is f, and the axial distance between the object-side surface of the first lens element and the image surface is TL, the following condition can be satisfied: $0.50<TL/f<1.15$. Therefore, it is favorable for increasing the resolution of the long shot images as well as reducing the total track length of the photographing lens system.

When a vertical distance between a critical point on the image-side surface of the fifth lens element and an optical axis is Yc52, and the central thickness of the second lens element is CT2, the following condition can be satisfied: $0.20<Yc52/CT2<7.50$. Therefore, it is favorable for correcting off-axis aberrations and providing a proper incident angle of light projected from the off-axis region; moreover, it is favorable for correcting Petzval field curvature. FIG. 23 shows a schematic view of Yc52 according to the 1st embodiment of the present disclosure, wherein the image-side surface of the fifth lens element has at least one critical point C.

According to the present disclosure, among the five lens elements, there can be at least three lens elements with each having an Abbe number less than 45.0. In detail, the lens elements can be made of materials with high dispersion (low Abbe number) so as to obtain a large density difference between the lens elements and the air; thus, the incident light is properly refracted within a shorter distance so that it is favorable for reducing the size of the photographing lens system as well as achieving higher image quality. Preferably, among the five lens elements, there can be at least four lens elements with each having an Abbe number less than 45.0.

When half of a maximum field of view of the photographing lens system is HFOV, the following condition can be satisfied: $0.15<\tan(HFOV)<0.35$. Therefore, it is favorable for providing a proper field of view so that the photographing lens system is widely applicable to different applications.

When a maximum effective radius of the object-side surface of the first lens element is Y11, and a maximum effective radius of the image-side surface of the fifth lens element is Y52, the following condition can be satisfied: $0.50<Y52/Y11<1.10$. Therefore, it is favorable for controlling the lens diameters so as to reduce a lateral thickness of the photographing lens system, thereby being applicable to a wide range of applications. FIG. 23 shows a schematic view of Y11 and Y52 according to the 1st embodiment of the present disclosure.

When the axial distance between the first lens element and the second lens element is T12, and the axial distance between the second lens element and the third lens element is T23, the following condition can be satisfied: $T12/T23<0.70$. Therefore, it is favorable for the arrangement of the axial distances between each adjacent lens element on the object side so that the first lens element and the second lens element are able to be configured to work as two correction lenses for each other in correcting aberrations, thereby improving image quality.

When the axial distance between the fourth lens element and the fifth lens element is T45, and an axial distance between the image-side surface of the fifth lens element and the image surface is BL, the following condition can be satisfied: $0.10<T45/BL<1.0$. Therefore, it is favorable for providing sufficient back focal length for accommodating additional elements so that the photographing lens system is able to be designed for various requirements.

When the axial distance between the second lens element and the third lens element is T23, and the axial distance between the third lens element and the fourth lens element is T34, the following condition can be satisfied: $T34/T23<1.0$. Therefore, it is favorable for properly arranging the axial distances between each adjacent lens element so as to reduce the sensitivity of the photographing lens system and prevent assembling problems. Preferably, the following condition can be satisfied: $T34/T23<0.30$.

Figure 24:
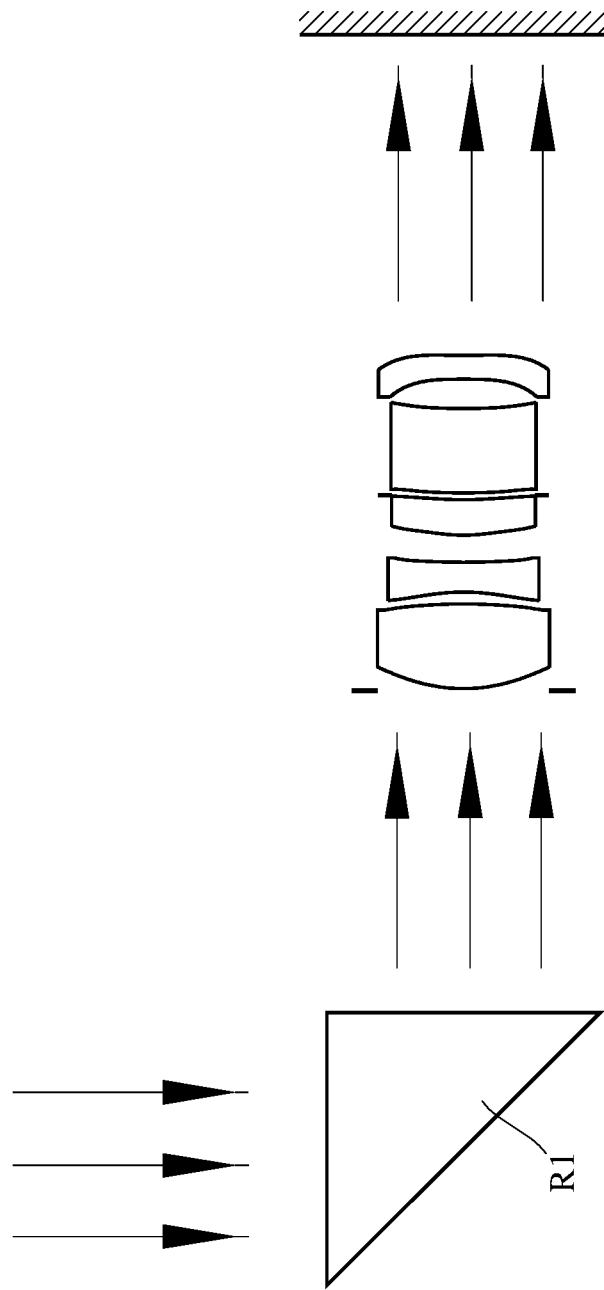
FIG. 24 is a schematic view of the photographing lens system including a reflector according to one embodiment of the present disclosure.
Figure 25:
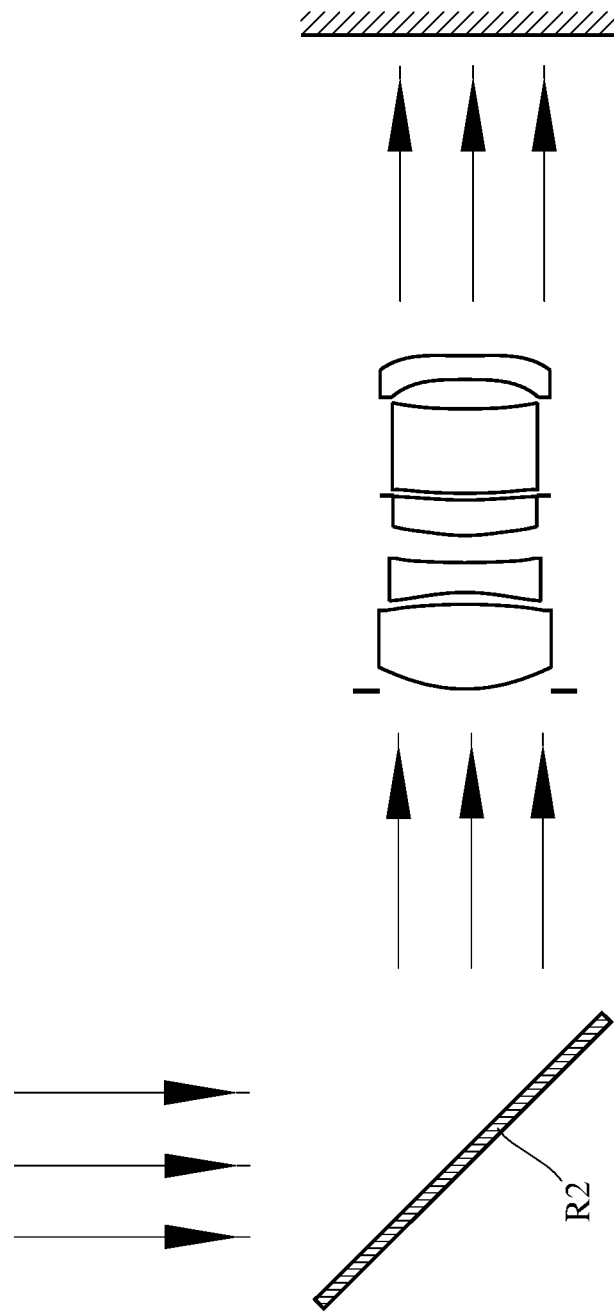
FIG. 25 is a schematic view of the photographing lens system including the reflector according to another embodiment of the present disclosure.
Figure 26:
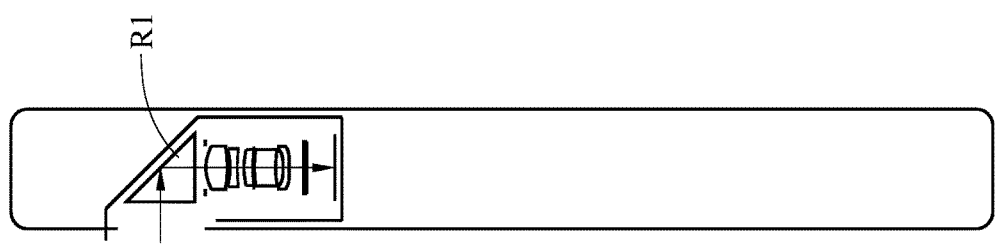
FIG. 26 is a schematic view of an electronic device including the reflector and the image capturing unit according to one embodiment of the present disclosure.

According to the present disclosure, the photographing lens system can include at least one reflector so that it is favorable for changing the direction of light so as to obtain higher lens design flexibility. FIG. 24 shows a schematic view of the photographing lens system including a reflector according to one embodiment of the present disclosure, wherein the reflector is a prism R1 which is disposed between the imaged object (not shown in the drawings) and the five lens elements of the photographing lens system (its reference numerals is omitted), but the disclosure is not limited thereto. FIG. 25 shows a schematic view of the photographing lens system including the reflector according to another embodiment of the present disclosure, wherein the reflector is a reflective mirror R2. FIG. 26 shows a schematic view of an electronic device including the reflector and the image capturing unit according to one embodiment of the present disclosure, wherein the reflector (prism R1) is favorable for changing the direction of incident light, so that the thickness of the electronic device is not restricted by the total track length of the photographing lens system.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the lens surface at which the surface changes from concave to convex, or vice versa. A critical point is a non-axial point of the lens surface where its tangent is perpendicular to the optical axis.

According to the present disclosure, an image surface of the photographing lens system, based on the corresponding image sensor, can be flat or curved, especially a curved surface being concave facing towards the object side of the photographing lens system.

According to the present disclosure, an image correction unit, such as a field flattener, can be optionally disposed between the image surface and the lens element closest thereto, for correction of aberrations such as field curvature. The optical properties of the image correction unit, such as curvature, thickness, index of refraction, position and surface shape (convex or concave surface with spherical, aspheric, diffraction or Fresnel types), can be adjusted according to the demand of an image capturing unit. In general, a preferable image correction unit is, for example, a thin transparent element having a concave object-side surface and a planar image-side surface, and the thin transparent element is disposed near the image surface.

According to the present disclosure, the photographing lens system can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the photographing lens system and thereby provides a wider field of view for the same.

According to the above description of the present disclosure, the following specific embodiments are provided for further explanation.

1st Embodiment

Figure 2:
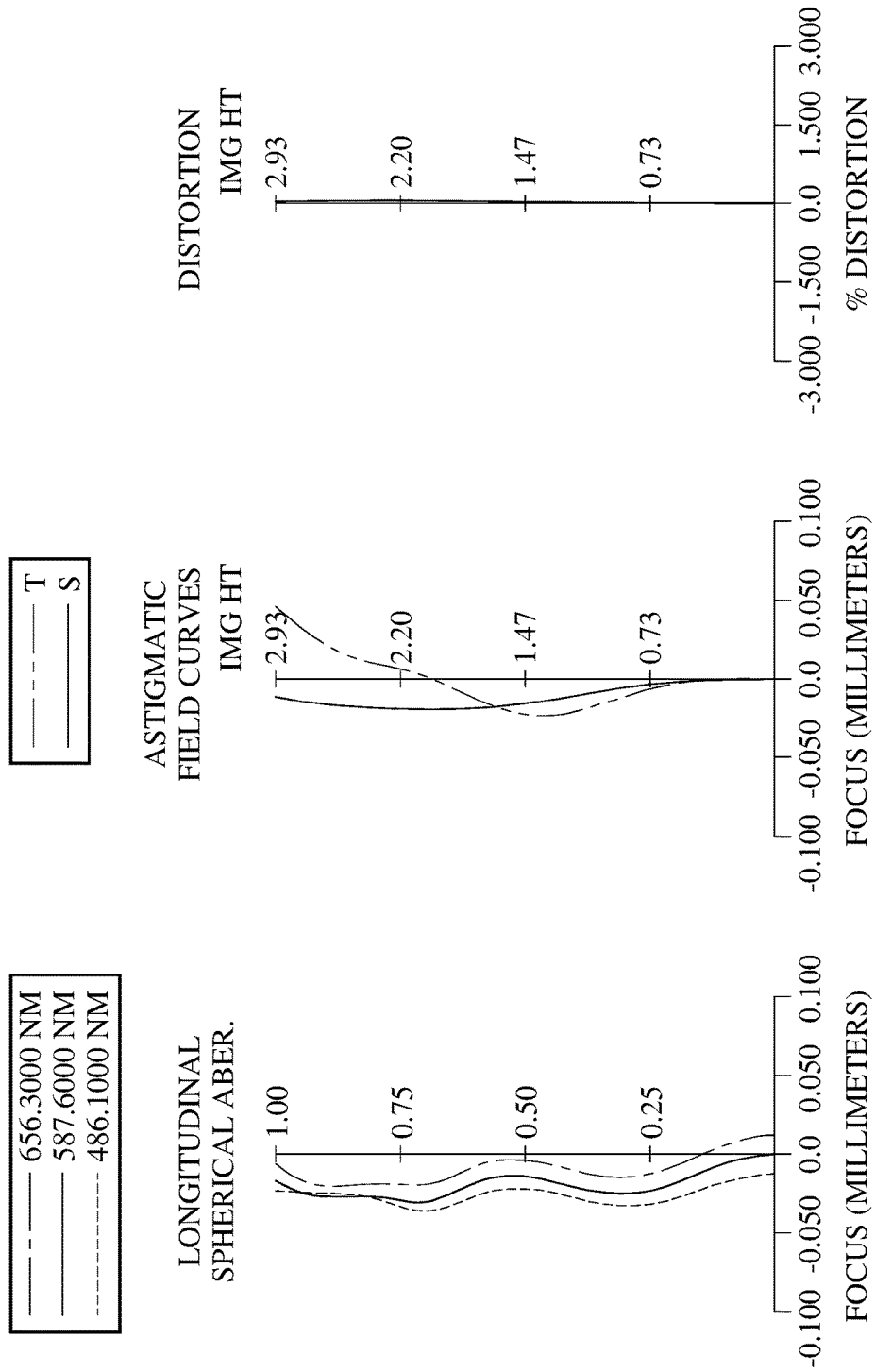
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens system (its reference numeral is omitted) of the present disclosure and an image sensor 180. The photographing lens system includes, in order from an object side to an image side, an aperture stop 100, a first lens element 110, a second lens element 120, a third lens element 130, a stop 101, a fourth lens element 140, a fifth lens element 150, a filter 160 and an image surface 170. The photographing lens system includes five single and non-cemented lens elements (110, 120, 130, 140 and 150) with no additional lens element disposed between the first lens element 110 and the fifth lens element 150. There is an air gap in a paraxial region between each adjacent lens element of the photographing lens system.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric. The object-side surface 111 of the first lens element 110 has one inflection point.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has one inflection point.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has two inflection points. The image-side surface 132 of the third lens element 130 has one inflection point.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has one inflection point.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has one inflection point.

The filter 160 is made of glass and located between the fifth lens element 150 and the image surface 170, and will not affect the focal length of the photographing lens system. The image sensor 180 is disposed on or near the image surface 170 of the photographing lens system.

In this embodiment, among the five lens elements, there are four lens elements with each having an Abbe number less than 45.0. In detail, the Abbe numbers of the second lens element 120, the third lens element 130, the fourth lens element 140 and the fifth lens element 150 are all less than 45.0.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing lens system of the image capturing unit according to the 1st embodiment, when a focal length of the photographing lens system is f, an f-number of the photographing lens system is Fno, and half of a maximum field of view of the photographing lens system is HFOV, these parameters have the following values: f=11.30 millimeters (mm), Fno=2.95, HFOV=14.6 degrees (deg.).

When an Abbe number of the third lens element 130 is V3, and an Abbe number of the fifth lens element 150 is V5, the following condition is satisfied: V3+V5=63.4.

When an axial distance between the first lens element 110 and the second lens element 120 is T12, and an axial distance between the second lens element 120 and the third lens element 130 is T23, the following condition is satisfied: T12/T23=0.44. In this embodiment, the axial distance between two adjacent lens elements is the air gap in a paraxial region between the two adjacent lens elements.

When the axial distance between the second lens element 120 and the third lens element 130 is T23, and an axial distance between the third lens element 130 and the fourth lens element 140 is T34, the following condition is satisfied: T34/T23=0.25.

When the axial distance between the first lens element 110 and the second lens element 120 is T12, and a central thickness of the fourth lens element 140 is CT4, the following condition is satisfied: T12/CT4=0.14.

When an axial distance between the fourth lens element 140 and the fifth lens element 150 is T45, and an axial distance between the image-side surface 152 of the fifth lens element 150 and the image surface 170 is BL, the following condition is satisfied: T45/BL=0.16.

When a central thickness of the second lens element 120 is CT2, and the central thickness of the fourth lens element 140 is CT4, the following condition is satisfied: CT2/CT4=0.35.

When the central thickness of the second lens element 120 is CT2, the axial distance between the second lens element 120 and the third lens element 130 is T23, and the axial distance between the third lens element 130 and the fourth lens element 140 is T34, the following condition is satisfied: (CT2+T34)/T23=1.35.

When the axial distance between the third lens element 130 and the fourth lens element 140 is T34, the axial distance between the fourth lens element 140 and the fifth lens element 150 is T45, and the central thickness of the fourth lens element 140 is CT4, the following condition is satisfied: (T34/T45)+(T45/CT4)=0.58.

When the central thickness of the second lens element 120 is CT2, a central thickness of the third lens element 130 is CT3, the central thickness of the fourth lens element 140 is CT4, and a central thickness of the fifth lens element 150 is CT5, the following condition is satisfied: (CT3+CT4)/(CT2+CT5)=2.24.

When a curvature radius of the object-side surface 131 of the third lens element 130 is R5, and a curvature radius of the image-side surface 132 of the third lens element 130 is R6, the following condition is satisfied: R5/R6=0.59.

When a curvature radius of the object-side surface 141 of the fourth lens element 140 is R7, and a curvature radius of the image-side surface 142 of the fourth lens element 140 is R8, the following condition is satisfied: (R7−R8)/(R7+R8)=−0.08.

When a composite focal length of the first lens element 110 and the second lens element 120 is f12, and a composite focal length of the third lens element 130, the fourth lens element 140 and the fifth lens element 150 is f345, the following condition is satisfied: f345/f12=0.90.

When the focal length of the photographing lens system is f, and a focal length of the first lens element 110 is f1, the following condition is satisfied: f/f1=2.14.

When a refractive power of the first lens element 110 is P1, and a refractive power of the second lens element 120 is P2, the following condition is satisfied: |P1|+|P2|=4.34.

When the refractive power of the first lens element 110 is P1, the refractive power of the second lens element 120 is P2, a refractive power of the third lens element 130 is P3, a refractive power of the fourth lens element 140 is P4, and a refractive power of the fifth lens element 150 is P5, the following condition is satisfied: (|P3|+|P4|+|P5|)/(|P1|+|P2|)=0.41.

When half of the maximum field of view of the photographing lens system is HFOV, the following condition is satisfied: tan(HFOV)=0.26.

When an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following condition is satisfied: SD/TD=1.01.

When a maximum effective radius of the object-side surface 111 of the first lens element 110 is Y11, and a maximum effective radius of the image-side surface 152 of the fifth lens element 150 is Y52, the following condition is satisfied: Y52/Y11=0.99.

When a vertical distance between a critical point on the image-side surface 152 of the fifth lens element 150 and an optical axis is Yc52, and the central thickness of the second lens element 120 is CT2, the following condition is satisfied: Yc52/CT2=0.95.

When an axial distance between the object-side surface 111 of the first lens element 110 and the image surface 170 is TL, and the focal length of the photographing lens system is f, the following condition is satisfied: TL/f=1.02.

When the axial distance between the object-side surface 111 of the first lens element 110 and the image surface 170 is TL, and a maximum image height of the photographing lens system is ImgH, the following condition is satisfied: TL/ImgH=3.92.

The detailed optical data of the 1st embodiment are shown in Table 1 and the aspheric surface data are shown in Table 2 below.

TABLE 1

1st Embodiment
f = 11.30 mm, Fno = 2.95, HFOV = 14.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.050 | | | | |
| 2 | Lens 1 | 3.680 | (ASP) | 1.890 | Plastic | 1.545 | 56.1 | 5.29 |
| 3 | | −10.853 | (ASP) | 0.266 | | | | |
| 4 | Lens 2 | −4.102 | (ASP) | 0.665 | Plastic | 1.614 | 26.0 | −5.12 |
| 5 | | 14.286 | (ASP) | 0.604 | | | | |
| 6 | Lens 3 | 3.558 | (ASP) | 0.791 | Plastic | 1.614 | 26.0 | 12.60 |
| 7 | | 6.032 | (ASP) | 0.103 | | | | |
| 8 | Stop | Plano | | 0.050 | | | | |
| 9 | Lens 4 | 12.139 | (ASP) | 1.884 | Plastic | 1.661 | 20.3 | 90.67 |
| 10 | | 14.285 | (ASP) | 0.655 | | | | |
| 11 | Lens 5 | −33.506 | (ASP) | 0.529 | Plastic | 1.566 | 37.4 | −14.57 |
| 12 | | 10.999 | (ASP) | 1.260 | | | | |
| 13 | Filter | Plano | | 0.300 | Glass | 1.517 | 64.2 | — |
| 14 | | Plano | | 2.503 | | | | |
| 15 | Image | Plano | | — | | | | |

Note:
Reference wavelength is 587.6 nm (d-line).
An effective radius of the stop 101 (Surface 8) is 1.600 mm.

TABLE 2

Aspheric Coefficients

| Surface # | 2 | 3 | 4 | 5 | 6 |
|---|---|---|---|---|---|
| k = | −3.3065E−01 | −3.5280E+00 | −1.1941E+00 | 5.4384E+00 | −7.5697E+00 |
| A4 = | −1.5427E−03 | 5.7539E−03 | 3.5148E−02 | −6.8295E−03 | −3.9210E−02 |
| A6 = | 3.7707E−04 | 8.5424E−03 | −1.1335E−02 | −1.0853E−02 | 3.0318E−03 |
| A8 = | −3.3532E−04 | −1.3501E−02 | 9.5068E−04 | 1.7323E−02 | 6.5270E−03 |
| A10 = | 3.8085E−05 | 6.5974E−03 | 6.0018E−04 | −9.9571E−03 | −1.7134E−03 |
| A12 = | −2.7598E−06 | −1.4583E−03 | 2.1666E−04 | 3.8295E−03 | 9.9917E−05 |
| A14 = | — | 1.2467E−04 | −1.7625E−04 | −8.7628E−04 | 1.2709E−06 |
| A16 = | — | — | 2.5424E−05 | 8.4833E−05 | — |

| Surface # | 7 | 9 | 10 | 11 | 12 |
|---|---|---|---|---|---|
| k = | −1.1485E+00 | 9.3638E+00 | −1.0000E+01 | 5.0000E+01 | 1.3151E+01 |
| A4 = | −8.6474E−02 | −4.2916E−02 | −3.9341E−03 | −8.2298E−02 | −7.0622E−02 |
| A6 = | 9.5575E−02 | 8.3574E−02 | 2.1186E−02 | 3.2416E−02 | 2.4896E−02 |
| A8 = | −6.4803E−02 | −6.4022E−02 | −1.3902E−02 | −1.1031E−02 | −8.7848E−03 |
| A10 = | 2.4471E−02 | 2.4092E−02 | 4.0000E−03 | 1.1179E−03 | 1.7315E−03 |
| A12 = | −4.6634E−03 | −4.6007E−03 | −5.8700E−04 | 7.4587E−05 | −1.4828E−04 |
| A14 = | 3.2498E−04 | 3.3736E−04 | 5.5005E−05 | — | — |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
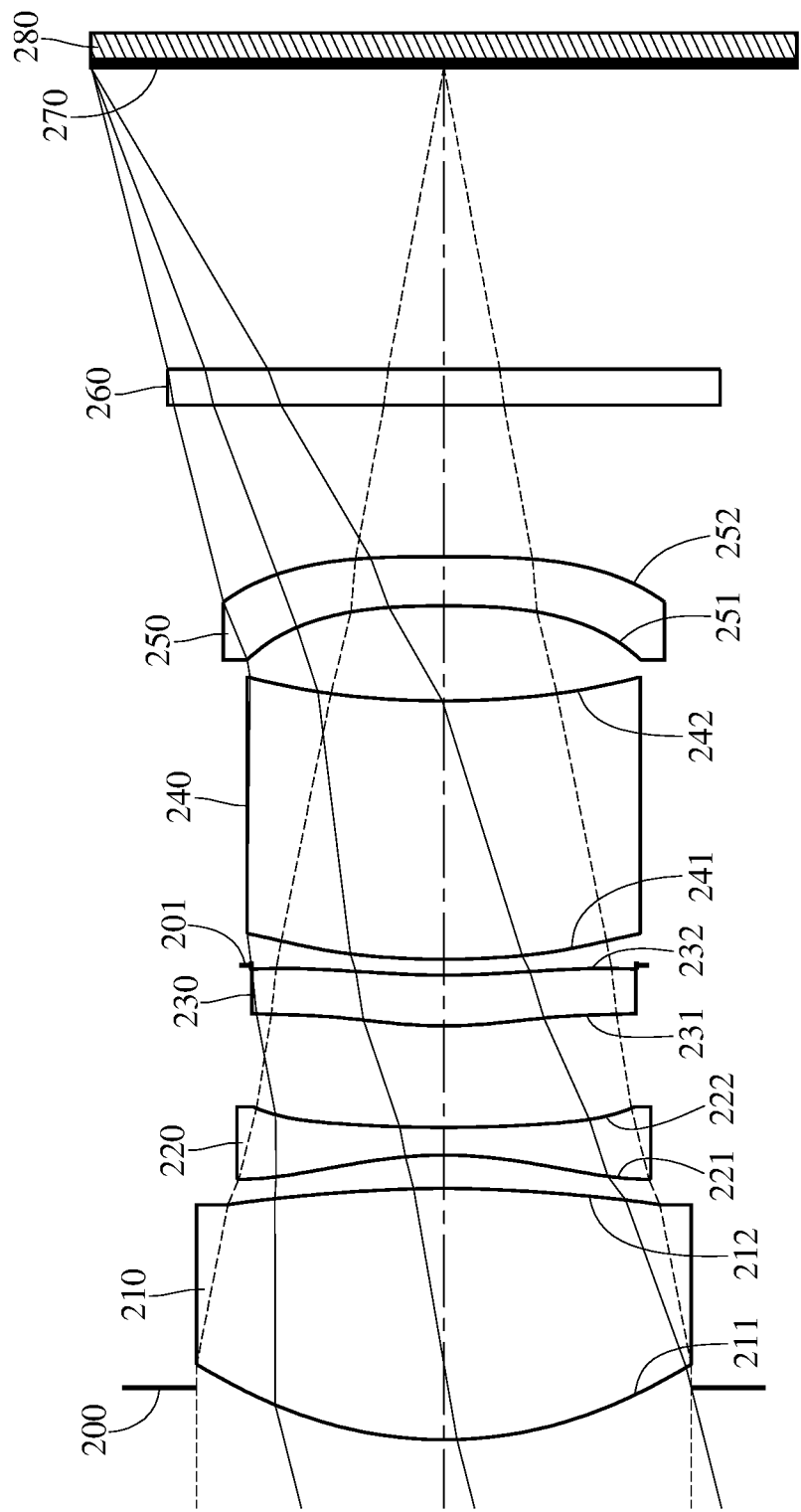
FIG. 3 is a schematic view of an image capturing unit according to the 2nd embodiment of the present disclosure.
Figure 4:
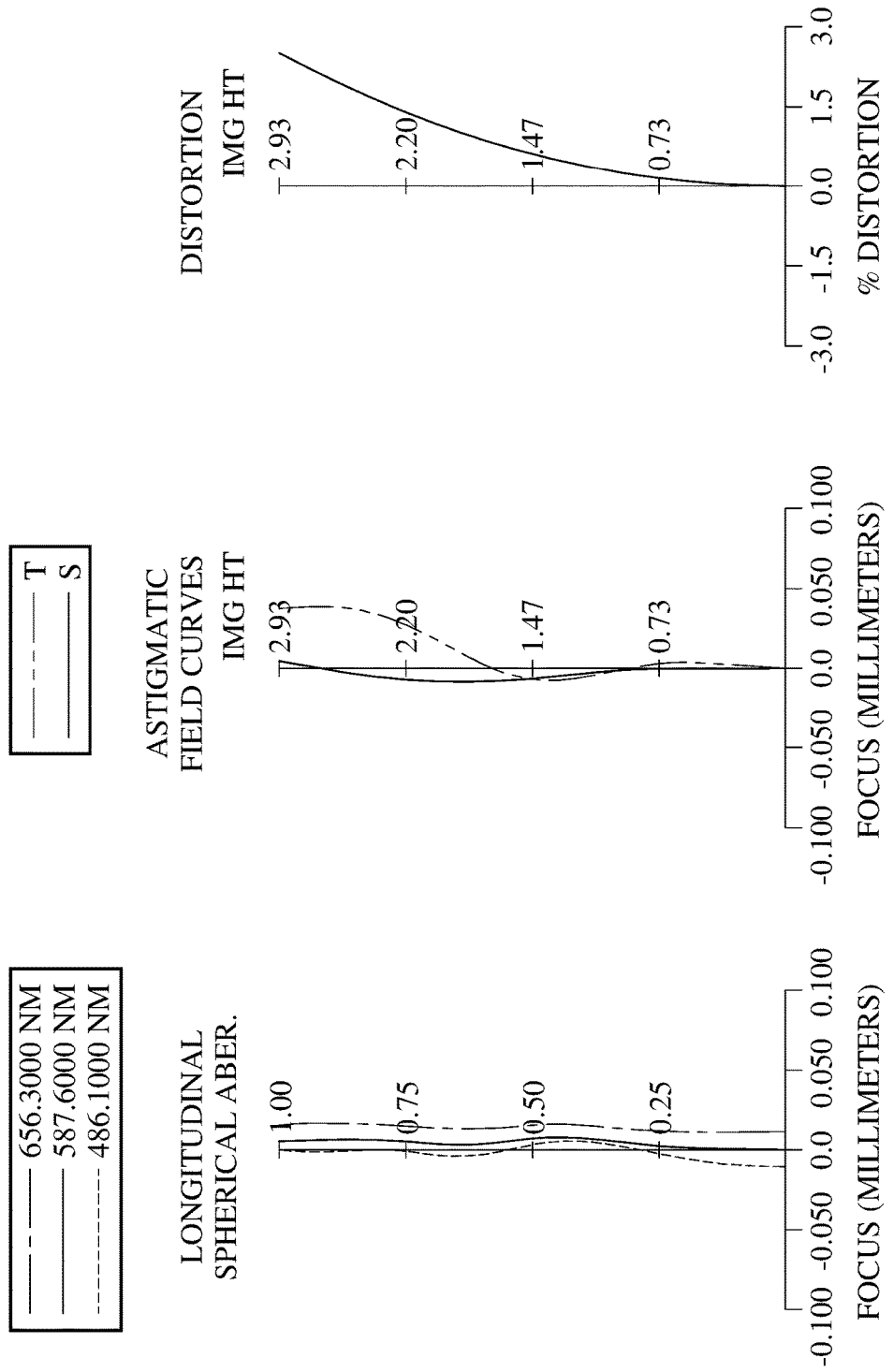
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens system (its reference numeral is omitted) of the present disclosure and an image sensor 280. The photographing lens system includes, in order from an object side to an image side, an aperture stop 200, a first lens element 210, a second lens element 220, a third lens element 230, a stop 201, a fourth lens element 240, a fifth lens element 250, a filter 260 and an image surface 270. The photographing lens system includes five single and non-cemented lens elements (210, 220, 230, 240 and 250) with no additional lens element disposed between the first lens element 210 and the fifth lens element 250. There is an air gap in a paraxial region between each adjacent lens element of the photographing lens system.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric. The object-side surface 211 of the first lens element 210 has one inflection point.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has two inflection points. The image-side surface 232 of the third lens element 230 has one inflection point.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The filter 260 is made of glass and located between the fifth lens element 250 and the image surface 270, and will not affect the focal length of the photographing lens system. The image sensor 280 is disposed on or near the image surface 270 of the photographing lens system.

In this embodiment, among the five lens elements, there are four lens elements each have an Abbe number less than 45.0. In detail, the Abbe numbers of the second lens element 220, the third lens element 230, the fourth lens element 240 and the fifth lens element 250 are all less than 45.0.

The detailed optical data of the 2nd embodiment are shown in Table 3 and the aspheric surface data are shown in Table 4 below.

TABLE 3

2nd Embodiment
f = 11.30 mm, Fno = 2.75, HFOV = 14.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.433 | | | | |
| 2 | Lens 1 | 3.484 | (ASP) | 2.090 | Plastic | 1.545 | 56.1 | 4.90 |
| 3 | | −9.022 | (ASP) | 0.277 | | | | |
| 4 | Lens 2 | −3.373 | (ASP) | 0.230 | Plastic | 1.614 | 26.0 | −4.24 |
| 5 | | 11.635 | (ASP) | 0.845 | | | | |
| 6 | Lens 3 | 3.649 | (ASP) | 0.421 | Plastic | 1.614 | 26.0 | 15.68 |
| 7 | | 5.620 | (ASP) | 0.082 | | | | |
| 8 | Stop | Plano | | 0.050 | | | | |
| 9 | Lens 4 | 6.247 | (ASP) | 2.150 | Plastic | 1.661 | 20.3 | 35.41 |
| 10 | | 7.356 | (ASP) | 0.790 | | | | |
| 11 | Lens 5 | −10.086 | (ASP) | 0.409 | Plastic | 1.566 | 37.4 | −22.70 |
| 12 | | −47.592 | (ASP) | 1.260 | | | | |
| 13 | Filter | Plano | | 0.300 | Glass | 1.517 | 64.2 | — |
| 14 | | Plano | | 2.506 | | | | |
| 15 | Image | Plano | | — | | | | |

Note:
Reference wavelength is 587.6 nm (d-line).
An effective radius of the stop 201 (Surface 8) is 1.600 mm.

TABLE 4

Aspheric Coefficients

| Surface # | 2 | 3 | 4 | 5 | 6 |
|---|---|---|---|---|---|
| k = | −1.6091E−01 | −4.3538E+00 | −1.8900E+00 | 4.4263E+01 | −1.0000E+01 |
| A4 = | −1.0566E−03 | 6.2591E−03 | 3.6587E−02 | −4.4150E−03 | −4.6070E−02 |
| A6 = | 7.2228E−04 | 1.0033E−02 | −1.0173E−02 | −1.1591E−02 | 9.3247E−04 |
| A8 = | −3.7332E−04 | −1.3271E−02 | 1.5192E−03 | 1.7197E−02 | 6.1920E−03 |
| A10 = | 6.1919E−05 | 6.4992E−03 | 6.5961E−04 | −9.9107E−03 | −1.6570E−03 |
| A12 = | −5.7886E−06 | −1.4776E−03 | 1.5008E−04 | 3.8468E−03 | 1.8526E−04 |
| A14 = | — | 1.2849E−04 | −2.0562E−04 | −8.8967E−04 | −1.6584E−05 |
| A16 = | — | — | 3.3825E−05 | 8.1296E−05 | — |

TABLE 4-continued

| Aspheric Coefficients | | | | | |
|---|---|---|---|---|---|
| Surface # | 7 | 9 | 10 | 11 | 12 |
| k = | −6.2220E+00 | 6.6419E+00 | −9.9931E−01 | −3.1881E+00 | 5.0000E+01 |
| A4 = | −8.8893E−02 | −4.3802E−02 | −9.6079E−03 | −7.6608E−02 | −5.7810E−02 |
| A6 = | 9.5148E−02 | 8.2435E−02 | 1.9819E−02 | 3.4951E−02 | 2.4175E−02 |
| A8 = | −6.5328E−02 | −6.3491E−02 | −1.2289E−02 | −1.3029E−02 | −8.9003E−03 |
| A10 = | 2.4433E−02 | 2.4059E−02 | 3.7715E−03 | 1.8425E−03 | 1.6801E−03 |
| A12 = | −4.6175E−03 | −4.6637E−03 | −6.3941E−04 | −6.6591E−05 | −1.3293E−04 |
| A14 = | 3.4234E−04 | 3.6971E−04 | 5.6632E−05 | — | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 11.30 | R5/R6 | 0.65 |
| Fno | 2.75 | (R7 − R8)/(R7 + R8) | −0.08 |
| HFOV [deg.] | 14.2 | f345/f12 | 0.48 |
| V3 + V5 | 63.4 | f/f1 | 2.31 |
| T12/T23 | 0.33 | \|P1\| + \|P2\| | 4.97 |
| T34/T23 | 0.16 | (\|P3\| + \|P4\| + \|P5\|)/(\|P1\| + \|P2\|) | 0.31 |
| T12/CT4 | 0.13 | tan(HFOV) | 0.25 |
| T45/BL | 0.19 | SD/TD | 0.94 |
| CT2/CT4 | 0.11 | Y52/Y11 | 0.89 |
| (CT2 + T34)/T23 | 0.43 | Yc52/CT2 | — |
| (T34/T45) + (T45/CT4) | 0.53 | TL/f | 1.01 |
| (CT3 + CT4)/(CT2 + CT5) | 4.02 | TL/ImgH | 3.89 |

3rd Embodiment

Figure 5:
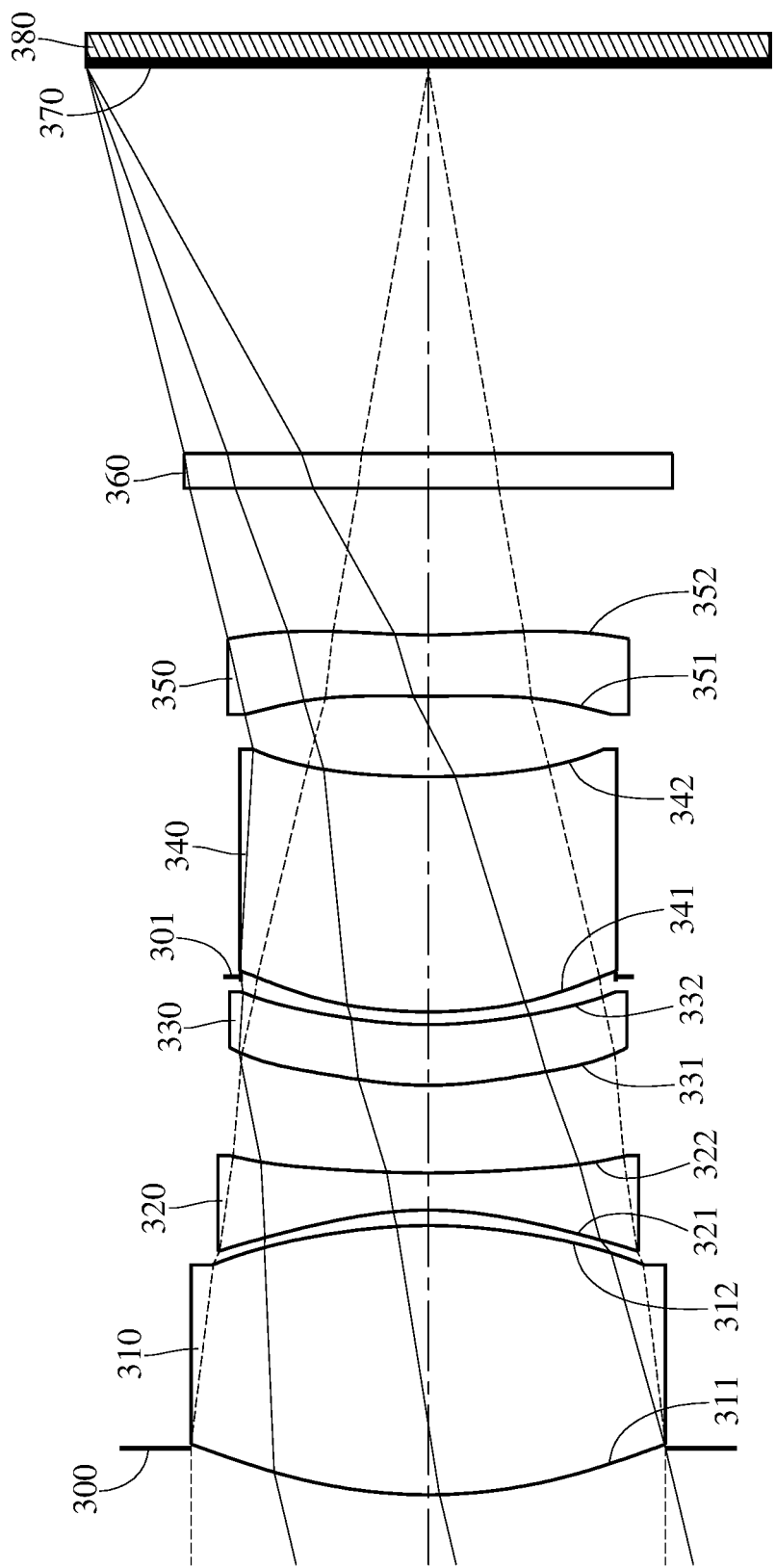
FIG. 5 is a schematic view of an image capturing unit according to the 3rd embodiment of the present disclosure.
Figure 6:
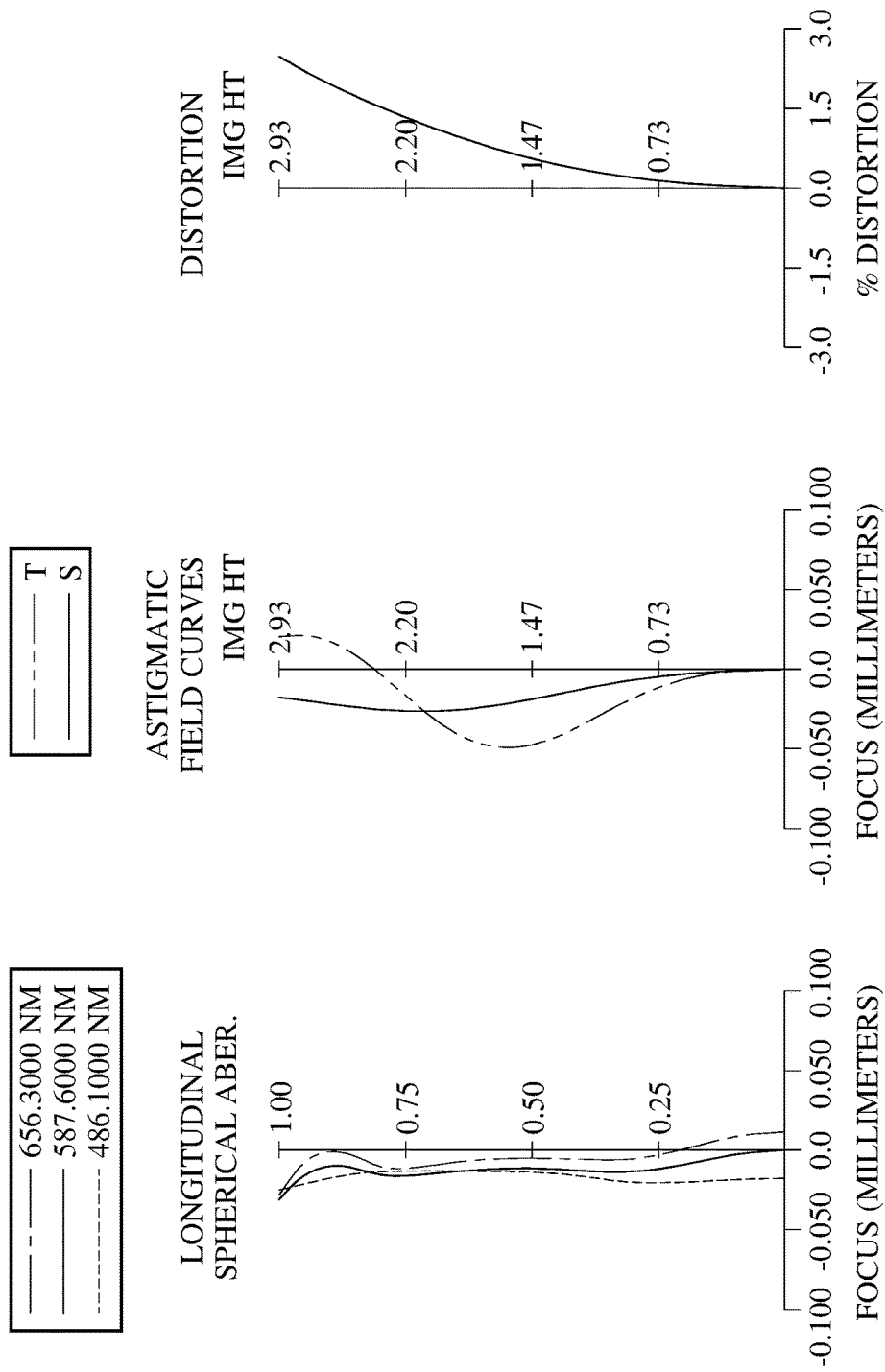
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens system (its reference numeral is omitted) of the present disclosure and an image sensor 380. The photographing lens system includes, in order from an object side to an image side, an aperture stop 300, a first lens element 310, a second lens element 320, a third lens element 330, a stop 301, a fourth lens element 340, a fifth lens element 350, a filter 360 and an image surface 370. The photographing lens system includes five single and non-cemented lens elements (310, 320, 330, 340 and 350) with no additional lens element disposed between the first lens element 310 and the fifth lens element 350. There is an air gap in a paraxial region between each adjacent lens element of the photographing lens system.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has one inflection point.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has two inflection points. The image-side surface 352 of the fifth lens element 350 has one inflection point.

The filter 360 is made of glass and located between the fifth lens element 350 and the image surface 370, and will not affect the focal length of the photographing lens system. The image sensor 380 is disposed on or near the image surface 370 of the photographing lens system.

In this embodiment, among the five lens elements, there are four lens elements each have an Abbe number less than 45.0. In detail, the Abbe numbers of the second lens element 320, the third lens element 330, the fourth lens element 340 and the fifth lens element 350 are all less than 45.0.

The detailed optical data of the 3rd embodiment are shown in Table 5 and the aspheric surface data are shown in Table 6 below.

TABLE 5

3rd Embodiment
f = 12.02 mm, Fno = 2.95, HFOV = 13.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.400 | | | | |
| 2 | Lens 1 | 4.447 | (ASP) | 2.313 | Plastic | 1.545 | 56.1 | 4.53 |
| 3 | | −4.542 | (ASP) | 0.133 | | | | |
| 4 | Lens 2 | −3.078 | (ASP) | 0.319 | Plastic | 1.614 | 26.0 | −3.74 |
| 5 | | 9.380 | (ASP) | 0.753 | | | | |
| 6 | Lens 3 | 3.154 | (ASP) | 0.521 | Plastic | 1.661 | 20.3 | 30.51 |
| 7 | | 3.493 | (ASP) | 0.411 | | | | |
| 8 | Stop | Plano | | −0.302 | | | | |
| 9 | Lens 4 | 3.896 | (ASP) | 2.021 | Plastic | 1.661 | 20.3 | 10.75 |
| 10 | | 6.845 | (ASP) | 0.692 | | | | |
| 11 | Lens 5 | 21.391 | (ASP) | 0.527 | Plastic | 1.614 | 26.0 | −15.03 |
| 12 | | 6.385 | (ASP) | 1.260 | | | | |
| 13 | Filter | Plano | | 0.300 | Glass | 1.517 | 64.2 | — |
| 14 | | Plano | | 3.317 | | | | |
| 15 | Image | Plano | | — | | | | |

Note:
Reference wavelength is 587.6 nm (d-line).
An effective radius of the stop 301 (Surface 8) is 1.610 mm.

TABLE 6

Aspheric Coefficients

| Surface # | 2 | 3 | 4 | 5 | 6 |
|---|---|---|---|---|---|
| k = | −4.4904E−01 | −5.0937E+00 | −1.4138E+00 | −7.3577E+00 | −5.8280E+00 |
| A4 = | −2.0358E−03 | 6.8739E−03 | 3.5805E−02 | −7.4171E−03 | −3.6601E−02 |
| A6 = | 5.4692E−04 | 8.4206E−03 | −1.1393E−02 | −1.1385E−02 | 3.8313E−03 |
| A8 = | −2.9099E−04 | −1.3520E−02 | 7.1525E−04 | 1.7288E−02 | 6.6344E−03 |
| A10 = | 4.3871E−05 | 6.5673E−03 | 5.2601E−04 | −1.0014E−02 | −1.7254E−03 |
| A12 = | −3.4661E−06 | −1.4656E−03 | 2.0522E−04 | 3.7890E−03 | 8.7748E−05 |
| A14 = | — | 1.2745E−04 | −1.7602E−04 | −8.8112E−04 | 5.2552E−06 |
| A16 = | — | — | 2.6667E−05 | 8.7887E−05 | — |

| Surface # | 7 | 9 | 10 | 11 | 12 |
|---|---|---|---|---|---|
| k = | 1.0852E−01 | 1.6207E+00 | 2.9713E+00 | 2.0338E+01 | 8.7578E+00 |
| A4 = | −8.8133E−02 | −4.2794E−02 | −5.2242E−03 | −7.8742E−02 | −6.9565E−02 |
| A6 = | 9.5457E−02 | 8.3301E−02 | 2.2080E−02 | 3.2145E−02 | 2.4847E−02 |
| A8 = | −6.4486E−02 | −6.4126E−02 | −1.2583E−02 | −9.6992E−03 | −8.6343E−03 |
| A10 = | 2.4605E−02 | 2.4127E−02 | 3.9802E−03 | 1.4132E−03 | 1.8061E−03 |
| A12 = | −4.6156E−03 | −4.5660E−03 | −8.1223E−04 | 4.9716E−05 | −1.7440E−04 |
| A14 = | 3.1520E−04 | 3.3476E−04 | 1.1872E−04 | — | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 12.02 | R5/R6 | 0.90 |
| Fno | 2.95 | (R7 − R8)/(R7 + R8) | −0.27 |
| HFOV [deg.] | 13.4 | f345/f12 | 0.15 |
| V3 + V5 | 46.3 | f/f1 | 2.65 |
| T12/T23 | 0.18 | |P1| + |P2| | 5.86 |
| T34/T23 | 0.14 | (|P3| + |P4| + |P5|)/ | 0.39 |

-continued

| 3rd Embodiment | | | |
|---|---|---|---|
| | | (|P1| + |P2|) | |
| T12/CT4 | 0.07 | tan(HFOV) | 0.24 |
| T45/BL | 0.14 | SD/TD | 0.95 |
| CT2/CT4 | 0.16 | Y52/Y11 | 0.85 |
| (CT2 + T34)/T23 | 0.57 | Yc52/CT2 | 3.09 |
| (T34/T45) + (T45/CT4) | 0.50 | TL/f | 1.02 |
| (CT3 + CT4)/(CT2 + CT5) | 3.00 | TL/ImgH | 4.18 |

4th Embodiment

Figure 7:
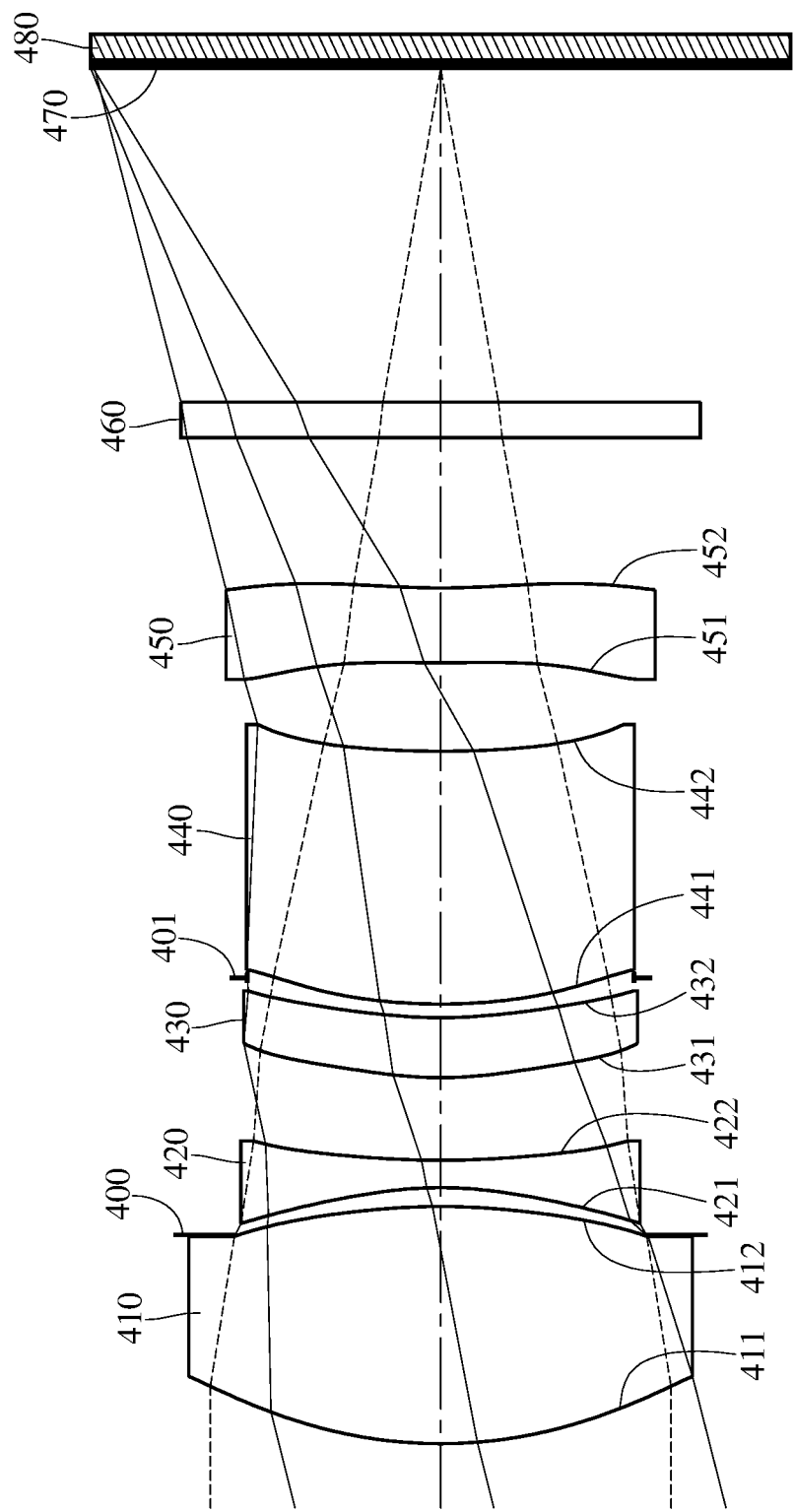
FIG. 7 is a schematic view of an image capturing unit according to the 4th embodiment of the present disclosure.
Figure 8:
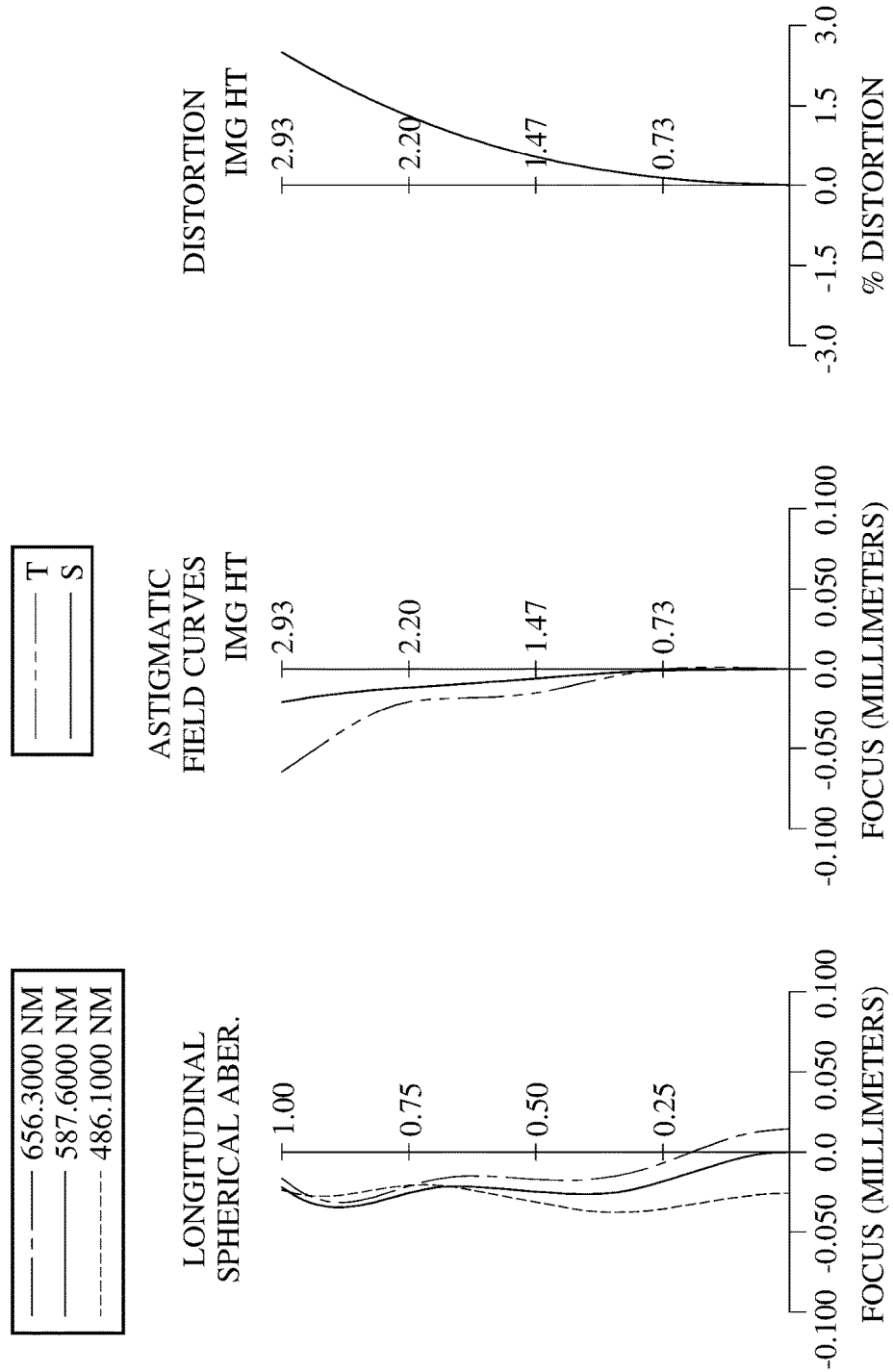
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens system (its reference numeral is omitted) of the present disclosure and an image sensor 480. The photographing lens system includes, in order from an object side to an image side, a first lens element 410, an aperture stop 400, a second lens element 420, a third lens element 430, a stop 401, a fourth lens element 440, a fifth lens element 450, a filter 460 and an image surface 470. The photographing lens system includes five single and non-cemented lens elements (410, 420, 430, 440 and 450) with no additional lens element disposed between the first lens element 410 and the fifth lens element 450. There is an air gap in a paraxial region between each adjacent lens element of the photographing lens system.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has one inflection point.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has one inflection point.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has two inflection points. The image-side surface 452 of the fifth lens element 450 has two inflection points.

The filter 460 is made of glass and located between the fifth lens element 450 and the image surface 470, and will not affect the focal length of the photographing lens system. The image sensor 480 is disposed on or near the image surface 470 of the photographing lens system.

In this embodiment, among the five lens elements, there are four lens elements each have an Abbe number less than 45.0. In detail, the Abbe numbers of the second lens element 420, the third lens element 430, the fourth lens element 440 and the fifth lens element 450 are all less than 45.0.

The detailed optical data of the 4th embodiment are shown in Table 7 and the aspheric surface data are shown in Table 8 below.

TABLE 7

4th Embodiment
f = 11.39 mm, Fno = 2.95, HFOV = 14.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.835 | (ASP) | 1.990 | Plastic | 1.545 | 56.1 | 4.49 |
| 2 | | −5.514 | (ASP) | −0.238 | | | | |
| 3 | Ape. Stop | Plano | | 0.396 | | | | |
| 4 | Lens 2 | −3.304 | (ASP) | 0.230 | Plastic | 1.614 | 26.0 | −3.69 |
| 5 | | 7.402 | (ASP) | 0.693 | | | | |
| 6 | Lens 3 | 3.178 | (ASP) | 0.503 | Plastic | 1.661 | 20.3 | 22.30 |
| 7 | | 3.797 | (ASP) | 0.333 | | | | |
| 8 | Stop | Plano | | −0.218 | | | | |
| 9 | Lens 4 | 4.477 | (ASP) | 2.121 | Plastic | 1.661 | 20.3 | 11.77 |
| 10 | | 8.567 | (ASP) | 0.743 | | | | |
| 11 | Lens 5 | 21.137 | (ASP) | 0.627 | Plastic | 1.614 | 26.0 | −14.30 |
| 12 | | 6.132 | (ASP) | 1.260 | | | | |
| 13 | Filter | Plano | | 0.300 | Glass | 1.517 | 64.2 | — |
| 14 | | Plano | | 2.798 | | | | |
| 15 | Image | Plano | | — | | | | |

Note:
Reference wavelength is 587.6 nm (d-line).
An effective radius of the stop 401 (Surface 8) is 1.620 mm.

TABLE 8

Aspheric Coefficients

| Surface # | 1 | 2 | 4 | 5 | 6 |
|---|---|---|---|---|---|
| k = | −2.7774E−01 | −5.2376E+00 | −1.3031E+00 | −3.8958E+00 | −6.5656E+00 |
| A4 = | −1.3951E−03 | 6.8460E−03 | 3.5353E−02 | −6.7959E−03 | −3.7074E−02 |
| A6 = | 3.7643E−04 | 8.3951E−03 | −1.1655E−02 | −1.1109E−02 | 3.7409E−03 |
| A8 = | −2.7402E−04 | −1.3535E−02 | 6.5431E−04 | 1.7330E−02 | 6.5661E−03 |
| A10 = | 6.0489E−05 | 6.5606E−03 | 5.1757E−04 | −1.0058E−02 | −1.7311E−03 |

TABLE 8-continued

| Aspheric Coefficients | | | | |
|---|---|---|---|---|
| A12 = | −7.0975E−06 | −1.4657E−03 | 2.0461E−04 | 3.7745E−03 | 1.0060E−04 |
| A14 = | — | 1.2775E−04 | −1.7640E−04 | −8.8014E−04 | 1.1443E−05 |
| A16 = | — | — | 2.7451E−05 | 9.0612E−05 | — |

| Surface # | 7 | 9 | 10 | 11 | 12 |
|---|---|---|---|---|---|
| k = | −2.1228E−01 | 1.6774E+00 | 4.1255E+00 | −3.0637E−02 | 8.4251E+00 |
| A4 = | −8.9092E−02 | −4.2436E−02 | −5.0526E−03 | −7.6278E−02 | −6.8457E−02 |
| A6 = | 9.4910E−02 | 8.3301E−02 | 2.2180E−02 | 3.2145E−02 | 2.4809E−02 |
| A8 = | −6.4639E−02 | −6.4276E−02 | −1.2033E−02 | −9.3316E−03 | −8.6326E−03 |
| A10 = | 2.4549E−02 | 2.4118E−02 | 4.0280E−03 | 1.5195E−03 | 1.8104E−03 |
| A12 = | −4.6266E−03 | −4.5556E−03 | −9.0962E−04 | −4.9559E−06 | −1.7787E−04 |
| A14 = | 3.3674E−04 | 3.3211E−04 | 1.3495E−04 | — | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 11.39 | R5/R6 | 0.84 |
| Fno | 2.95 | (R7 − R8)/(R7 + R8) | −0.31 |
| HFOV [deg.] | 14.2 | f345/f12 | 0.15 |
| V3 + V5 | 46.3 | f/f1 | 2.54 |
| T12/T23 | 0.23 | |P1| + |P2| | 5.62 |
| T34/T23 | 0.17 | (|P3| + |P4| + |P5|)/(|P1| + |P2|) | 0.40 |
| T12/CT4 | 0.07 | tan(HFOV) | 0.25 |
| T45/BL | 0.17 | SD/TD | 0.76 |
| CT2/CT4 | 0.11 | Y52/Y11 | 0.85 |
| (CT2 + T34)/T23 | 0.50 | Yc52/CT2 | 4.61 |
| (T34/T45) + (T45/CT4) | 0.51 | TL/f | 1.01 |
| (CT3 + CT4)/(CT2 + CT5) | 3.06 | TL/ImgH | 3.93 |

5th Embodiment

Figure 9:
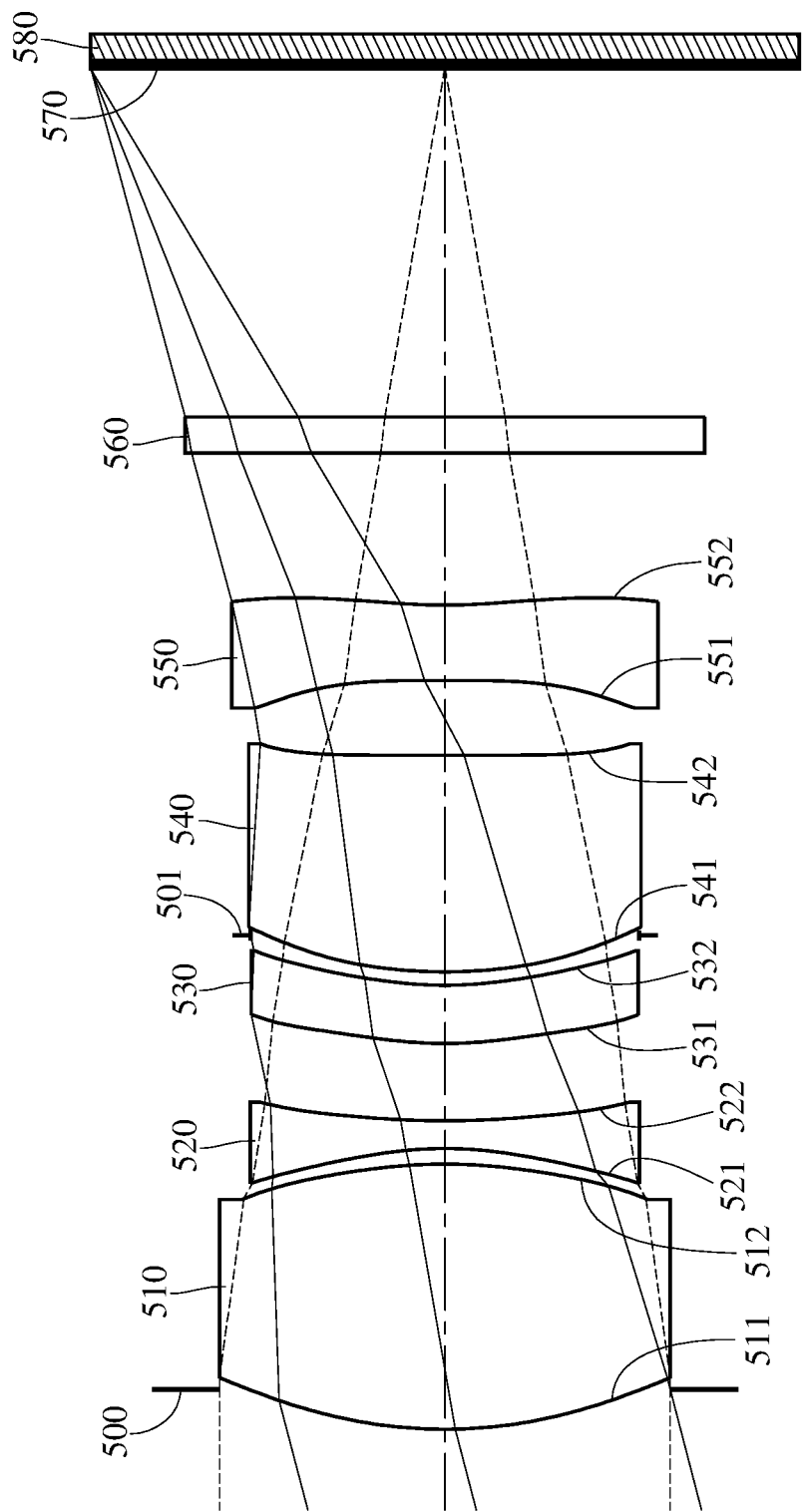
FIG. 9 is a schematic view of an image capturing unit according to the 5th embodiment of the present disclosure.
Figure 10:
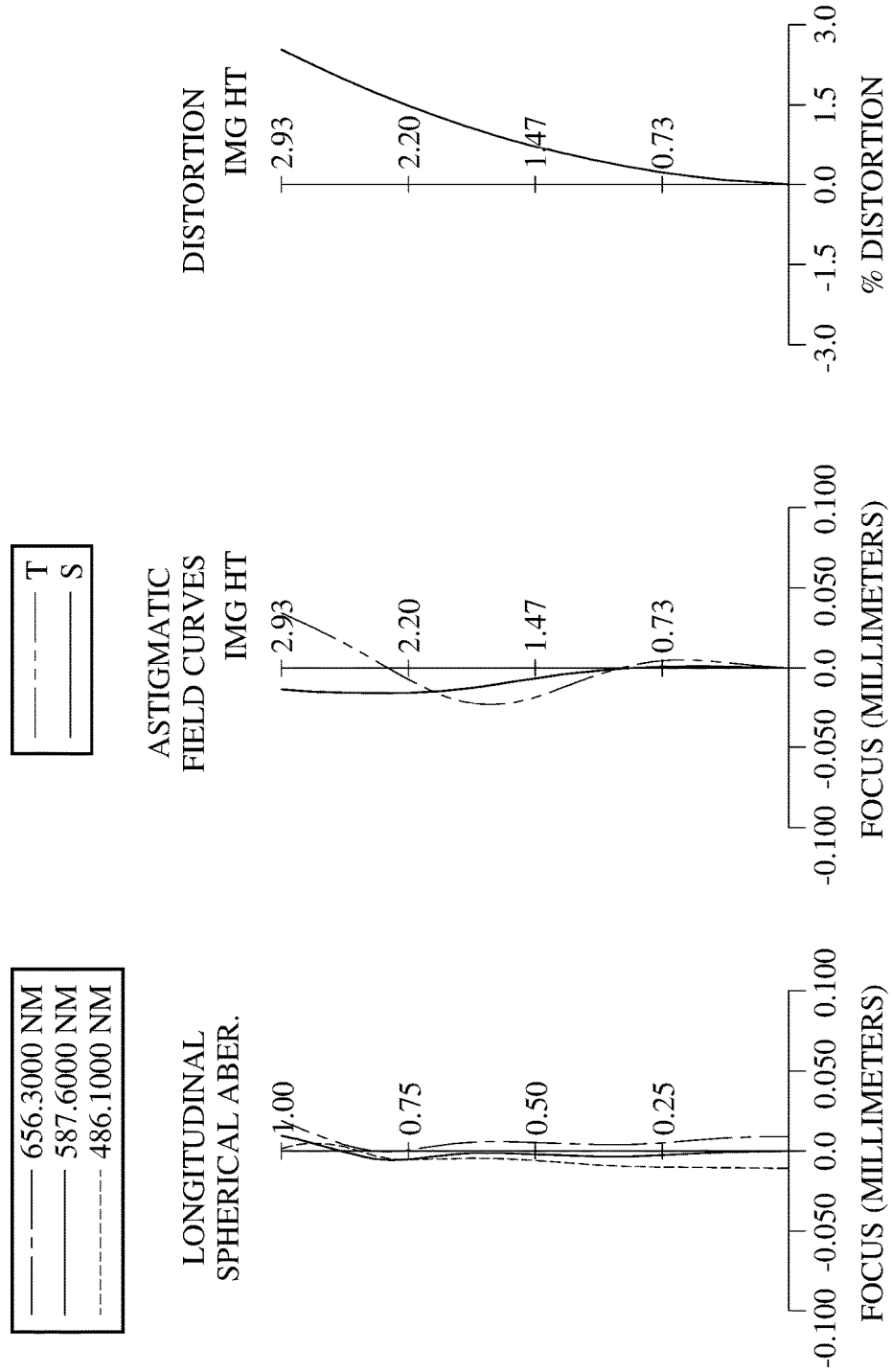
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens system (its reference numeral is omitted) of the present disclosure and an image sensor 580. The photographing lens system includes, in order from an object side to an image side, an aperture stop 500, a first lens element 510, a second lens element 520, a third lens element 530, a stop 501, a fourth lens element 540, a fifth lens element 550, a filter 560 and an image surface 570. The photographing lens system includes five single and non-cemented lens elements (510, 520, 530, 540 and 550) with no additional lens element disposed between the first lens element 510 and the fifth lens element 550. There is an air gap in a paraxial region between each adjacent lens element of the photographing lens system.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has one inflection point.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The image-side surface 542 of the fourth lens element 540 has one inflection point.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has one inflection point. The image-side surface 552 of the fifth lens element 550 has one inflection point.

The filter 560 is made of glass and located between the fifth lens element 550 and the image surface 570, and will not affect the focal length of the photographing lens system. The image sensor 580 is disposed on or near the image surface 570 of the photographing lens system.

In this embodiment, among the five lens elements, there are four lens elements each have an Abbe number less than 45.0. In detail, the Abbe numbers of the second lens element 520, the third lens element 530, the fourth lens element 540 and the fifth lens element 550 are all less than 45.0.

The detailed optical data of the 5th embodiment are shown in Table 9 and the aspheric surface data are shown in Table 10 below.

TABLE 9

5th Embodiment
f = 11.01 mm, Fno = 2.95, HFOV = 14.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.329 | | | | |
| 2 | Lens 1 | 3.919 | (ASP) | 2.200 | Plastic | 1.545 | 56.1 | 4.13 |
| 3 | | −4.231 | (ASP) | 0.129 | | | | |
| 4 | Lens 2 | −3.116 | (ASP) | 0.230 | Plastic | 1.614 | 26.0 | −3.53 |
| 5 | | 7.293 | (ASP) | 0.641 | | | | |
| 6 | Lens 3 | 3.378 | (ASP) | 0.483 | Plastic | 1.671 | 19.3 | −199.25 |
| 7 | | 3.105 | (ASP) | 0.414 | | | | |
| 8 | Stop | Plano | | −0.303 | | | | |
| 9 | Lens 4 | 3.932 | (ASP) | 1.798 | Plastic | 1.661 | 20.3 | 5.91 |
| 10 | | −451.671 | (ASP) | 0.619 | | | | |
| 11 | Lens 5 | −138.559 | (ASP) | 0.626 | Plastic | 1.614 | 26.0 | −7.88 |
| 12 | | 5.021 | (ASP) | 1.260 | | | | |
| 13 | Filter | Plano | | 0.300 | Glass | 1.517 | 64.2 | — |
| 14 | | Plano | | 2.888 | | | | |
| 15 | Image | Plano | | — | | | | |

Note:
Reference wavelength is 587.6 nm (d-line).
An effective radius of the stop 501 (Surface 8) is 1.610 mm.

TABLE 10

Aspheric Coefficients

| Surface # | 2 | 3 | 4 | 5 | 6 |
|---|---|---|---|---|---|
| k = | −3.8629E−01 | −7.2927E+00 | −1.9370E+00 | −4.2233E+00 | −7.2439E+00 |
| A4 = | −1.7738E−03 | 7.2351E−03 | 3.7326E−02 | −6.8981E−03 | −3.6793E−02 |
| A6 = | 3.9844E−04 | 8.0146E−03 | −1.1540E−02 | −1.1048E−02 | 3.7108E−03 |
| A8 = | −3.0914E−04 | −1.3651E−02 | 4.2187E−04 | 1.7635E−02 | 6.4597E−03 |
| A10 = | 5.9167E−05 | 6.5039E−03 | 4.6932E−04 | −1.0060E−02 | −1.7412E−03 |
| A12 = | −8.6203E−06 | −1.4753E−03 | 1.9023E−04 | 3.7263E−03 | 9.6069E−05 |
| A14 = | — | 1.3463E−04 | −1.7830E−04 | −8.9241E−04 | 9.6253E−06 |
| A16 = | — | — | 3.0571E−05 | 9.6825E−05 | — |

| Surface # | 7 | 9 | 10 | 11 | 12 |
|---|---|---|---|---|---|
| k = | −3.5029E−01 | 1.5471E+00 | 5.0000E+01 | 5.0000E+01 | 4.8264E+00 |
| A4 = | −9.0544E−02 | −4.3639E−02 | −3.4595E−02 | −7.7822E−02 | −6.9243E−02 |
| A6 = | 9.4340E−02 | 8.4042E−02 | 2.0594E−02 | 3.2145E−02 | 2.4434E−02 |
| A8 = | −6.4501E−02 | −6.4106E−02 | −1.0794E−02 | −1.0568E−02 | −8.6822E−03 |
| A10 = | 2.4614E−02 | 2.4129E−02 | 3.9613E−03 | 1.6093E−03 | 1.8208E−03 |
| A12 = | −4.6211E−03 | −4.5316E−03 | −1.0495E−03 | 7.4670E−05 | −1.7601E−04 |
| A14 = | 3.3216E−04 | 3.3528E−04 | 1.8277E−04 | — | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 11.01 | R5/R6 | 1.09 |
| Fno | 2.95 | (R7 − R8)/(R7 + R8) | −1.02 |
| HFOV [deg.] | 14.6 | f345/f12 | 0.35 |
| V3 + V5 | 45.3 | f/f1 | 2.67 |
| T12/T23 | 0.20 | |P1| + |P2| | 5.79 |
| T34/T23 | 0.17 | (|P3| + |P4| + |P5|)/(|P1| + |P2|) | 0.57 |
| T12/CT4 | 0.07 | tan(HFOV) | 0.26 |
| T45/BL | 0.14 | SD/TD | 0.95 |
| CT2/CT4 | 0.13 | Y52/Y11 | 0.95 |
| (CT2 + T34)/T23 | 0.53 | Yc52/CT2 | 5.39 |
| (T34/T45) + (T45/CT4) | 0.52 | TL/f | 1.02 |
| (CT3 + CT4)/(CT2 + CT5) | 2.66 | TL/ImgH | 3.85 |

6th Embodiment

Figure 11:
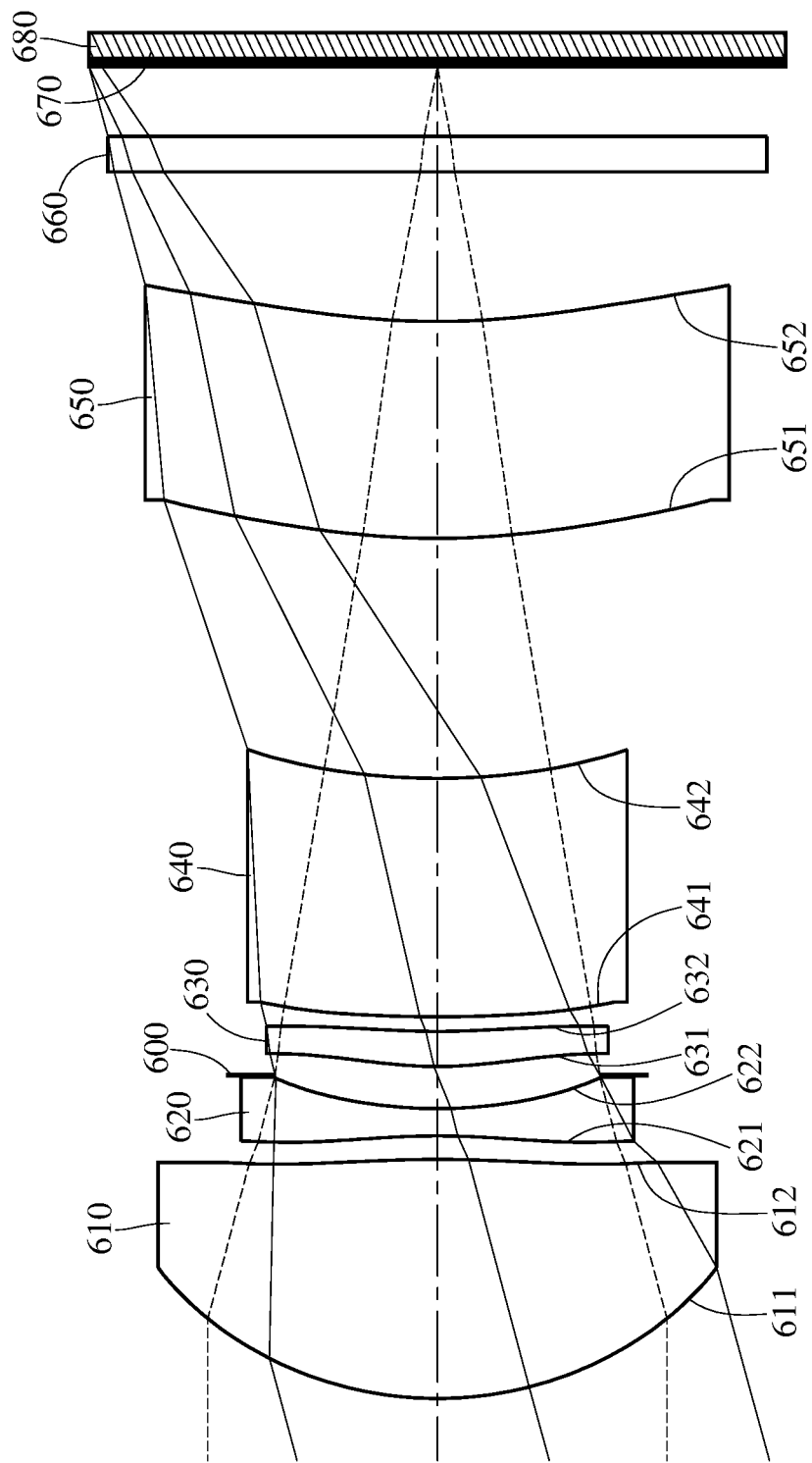
FIG. 11 is a schematic view of an image capturing unit according to the 6th embodiment of the present disclosure.
Figure 12:
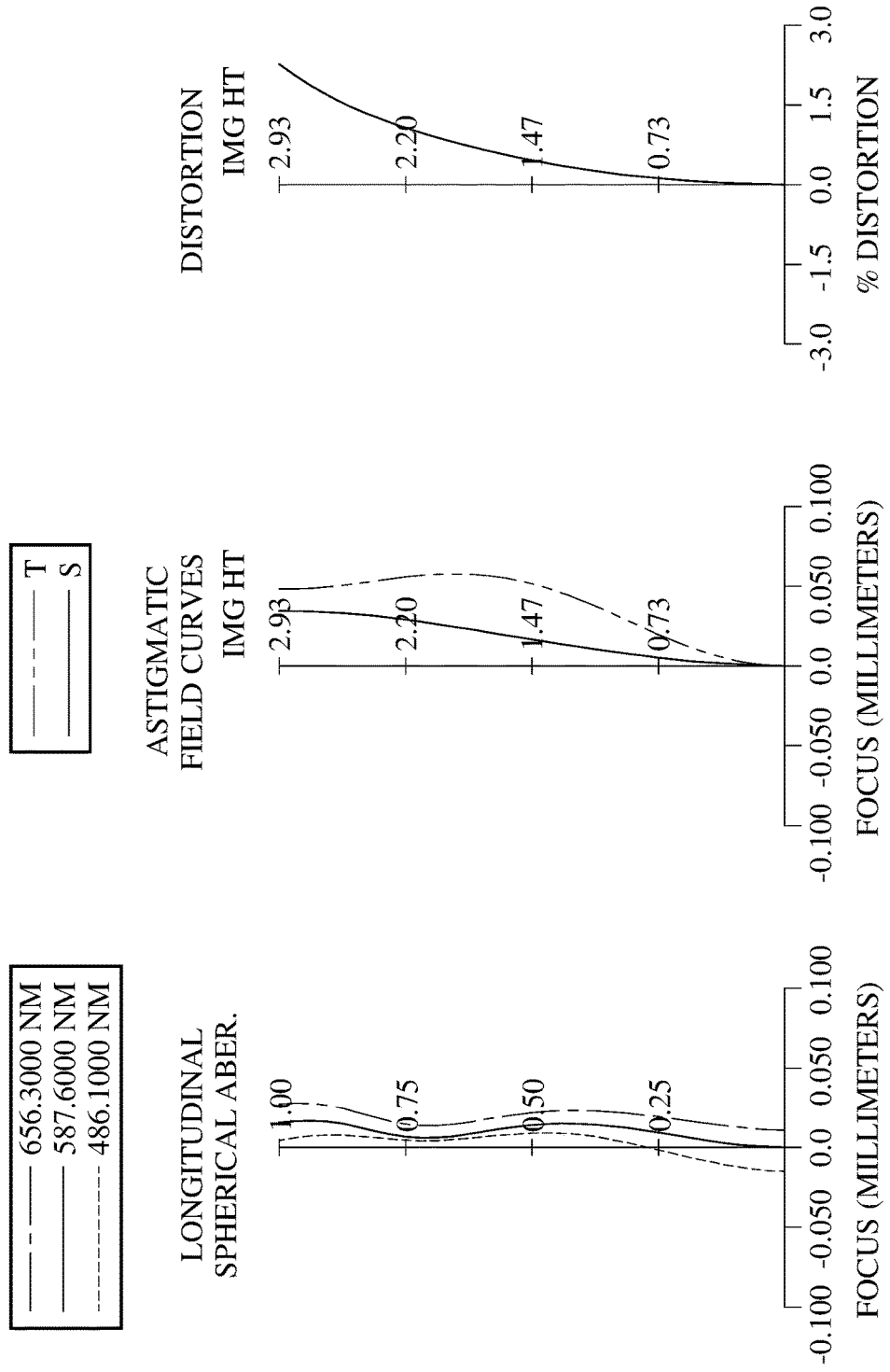
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens system (its reference numeral is omitted) of the present disclosure and an image sensor 680. The photographing lens system includes, in order from an object side to an image side, a first lens element 610, a second lens element 620, an aperture stop 600, a third lens element 630, a fourth lens element 640, a fifth lens element 650, a filter 660 and an image surface 670. The photographing lens system includes five single and non-cemented lens elements (610, 620, 630, 640 and 650) with no additional lens element disposed between the first lens element 610 and the fifth lens element 650. There is an air gap in a paraxial region between each adjacent lens element of the photographing lens system.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric. The image-side surface 612 of the first lens element 610 has two inflection points.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has two inflection points.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has two inflection points. The image-side surface 632 of the third lens element 630 has two inflection points.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The filter 660 is made of glass and located between the fifth lens element 650 and the image surface 670, and will not affect the focal length of the photographing lens system. The image sensor 680 is disposed on or near the image surface 670 of the photographing lens system.

In this embodiment, among the five lens elements, there are four lens elements each have an Abbe number less than 45.0. In detail, the Abbe numbers of the second lens element 620, the third lens element 630, the fourth lens element 640 and the fifth lens element 650 are all less than 45.0.

The detailed optical data of the 6th embodiment are shown in Table 11 and the aspheric surface data are shown in Table 12 below.

TABLE 11

6th Embodiment
f = 10.51 mm, Fno = 2.72, HFOV = 15.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.118 | (ASP) | 2.014 | Plastic | 1.545 | 56.1 | 4.64 |
| 2 | | −10.333 | (ASP) | 0.198 | | | | |
| 3 | Lens 2 | −6.091 | (ASP) | 0.230 | Plastic | 1.614 | 26.0 | −3.88 |
| 4 | | 3.972 | (ASP) | 0.282 | | | | |
| 5 | Ape. Stop | Plano | | 0.073 | | | | |
| 6 | Lens 3 | 3.465 | (ASP) | 0.295 | Plastic | 1.671 | 19.3 | 11.64 |
| 7 | | 6.017 | (ASP) | 0.123 | | | | |
| 8 | Lens 4 | 9.505 | (ASP) | 2.009 | Plastic | 1.661 | 20.3 | −28.14 |
| 9 | | 5.760 | (ASP) | 2.022 | | | | |
| 10 | Lens 5 | 6.315 | (ASP) | 1.827 | Plastic | 1.614 | 26.0 | 91.36 |
| 11 | | 6.333 | (ASP) | 1.260 | | | | |
| 12 | Filter | Plano | | 0.300 | Glass | 1.517 | 64.2 | — |
| 13 | | Plano | | 0.583 | | | | |
| 14 | Image | Plano | | — | | | | |

Note:
Reference wavelength is 587.6 nm (d-line).

TABLE 12

Aspheric Coefficients

| Surface # | 1 | 2 | 3 | 4 | 6 |
|---|---|---|---|---|---|
| k = | −1.1785E−01 | −1.0000E+01 | −3.9028E+00 | 2.6296E−01 | −1.0000E+01 |
| A4 = | −3.2667E−04 | 1.2680E−02 | 4.0763E−02 | 1.7448E−03 | −3.8447E−02 |
| A6 = | 7.6458E−04 | 9.7850E−03 | −9.8680E−03 | −1.2455E−02 | 2.1598E−03 |
| A8 = | −2.8576E−04 | −1.2736E−02 | 4.8706E−04 | 1.8144E−02 | 4.0171E−03 |
| A10 = | 5.5202E−05 | 6.4889E−03 | 6.5279E−04 | −1.0160E−02 | −2.2867E−03 |
| A12 = | −2.6476E−06 | −1.5041E−03 | 2.2055E−04 | 3.6552E−03 | 1.8237E−04 |

TABLE 12-continued

| Aspheric Coefficients | | | | | |
|---|---|---|---|---|---|
| A14 = | — | 1.2851E−04 | −2.1850E−04 | −8.9821E−04 | 1.5590E−04 |
| A16 = | — | — | 3.0972E−05 | 9.8123E−05 | — |
| Surface # | 7 | 8 | 9 | 10 | 11 |
| k = | −5.6354E−02 | 3.9838E+00 | −1.0000E+01 | −1.0000E+01 | 1.8009E+00 |
| A4 = | −9.2473E−02 | −4.9885E−02 | 5.8500E−03 | −2.8020E−03 | −9.3754E−03 |
| A6 = | 9.3551E−02 | 8.5703E−02 | 1.2856E−03 | 5.0362E−04 | 6.8433E−04 |
| A8 = | −6.4604E−02 | −6.4017E−02 | 5.5963E−04 | −3.1551E−05 | −5.8642E−05 |
| A10 = | 2.4249E−02 | 2.5575E−02 | −8.8274E−04 | 5.2696E−06 | 5.2865E−06 |
| A12 = | −4.7975E−03 | −5.2139E−03 | 3.4327E−04 | −3.8339E−07 | −1.9268E−07 |
| A14 = | 4.8780E−04 | 4.2260E−04 | −4.7843E−05 | — | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 10.51 | R5/R6 | 0.58 |
| Fno | 2.72 | (R7 − R8)/(R7 + R8) | 0.25 |
| HFOV [deg.] | 15.2 | f345/f12 | 0.42 |
| V3 + V5 | 45.3 | f/f1 | 2.26 |
| T12/T23 | 0.56 | |P1| + |P2| | 4.97 |
| T34/T23 | 0.35 | (|P3| + |P4| + |P5|)/(|P1| + |P2|) | 0.28 |
| T12/CT4 | 0.10 | tan(HFOV) | 0.27 |
| T45/BL | 0.94 | SD/TD | 0.70 |
| CT2/CT4 | 0.11 | Y52/Y11 | 1.05 |
| (CT2 + T34)/T23 | 0.99 | Yc52/CT2 | — |
| (T34/T45) + (T45/CT4) | 1.07 | TL/f | 1.07 |
| (CT3 + CT4)/(CT2 + CT5) | 1.12 | TL/ImgH | 3.82 |

7th Embodiment

Figure 13:
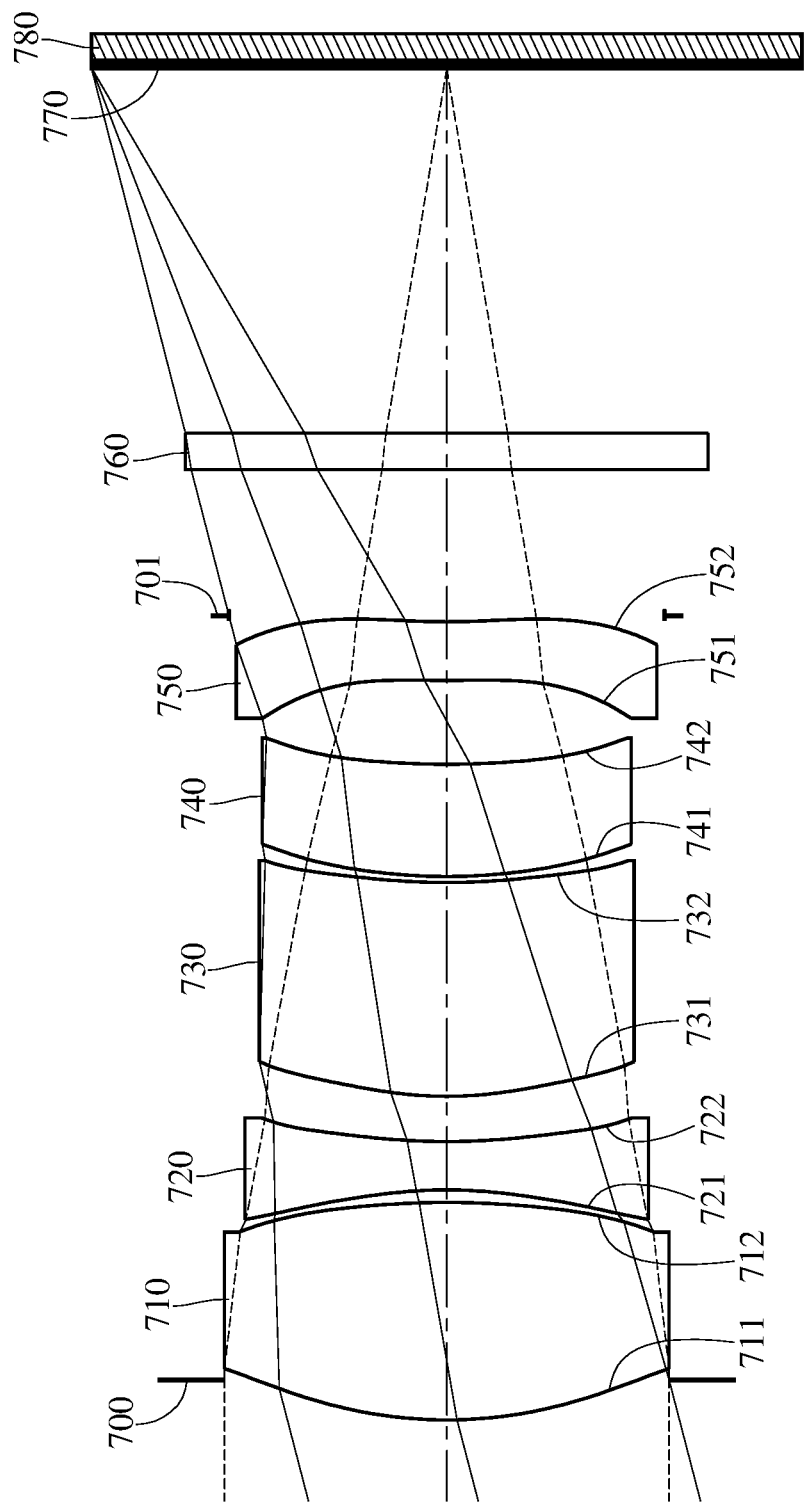
FIG. 13 is a schematic view of an image capturing unit according to the 7th embodiment of the present disclosure.
Figure 14:
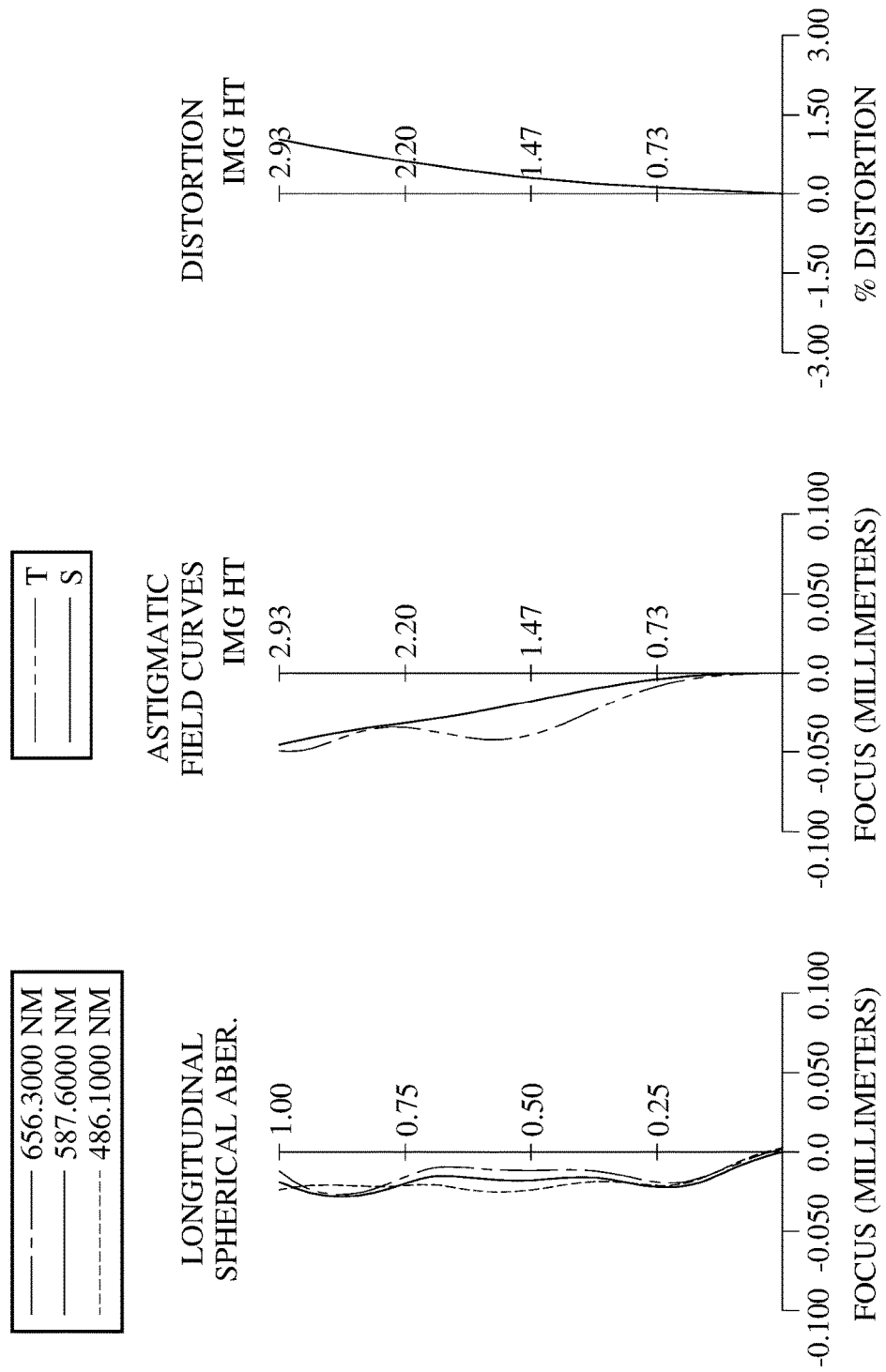
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens system (its reference numeral is omitted) of the present disclosure and an image sensor 780. The photographing lens system includes, in order from an object side to an image side, an aperture stop 700, a first lens element 710, a second lens element 720, a third lens element 730, a fourth lens element 740, a fifth lens element 750, a stop 701, a filter 760 and an image surface 770. The photographing lens system includes five single and non-cemented lens elements (710, 720, 730, 740 and 750) with no additional lens element disposed between the first lens element 710 and the fifth lens element 750. There is an air gap in a paraxial region between each adjacent lens element of the photographing lens system.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has one inflection point.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has two inflection points.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has one inflection point.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has two inflection points. The image-side surface 752 of the fifth lens element 750 has one inflection point.

The filter 760 is made of glass and located between the fifth lens element 750 and the image surface 770, and will not affect the focal length of the photographing lens system. The image sensor 780 is disposed on or near the image surface 770 of the photographing lens system.

In this embodiment, among the five lens elements, there are four lens elements each have an Abbe number less than 45.0. In detail, the Abbe numbers of the second lens element 720, the third lens element 730, the fourth lens element 740 and the fifth lens element 750 are all less than 45.0.

The detailed optical data of the 7th embodiment are shown in Table 13 and the aspheric surface data are shown in Table 14 below.

TABLE 13

7th Embodiment
f = 11.20 mm, Fno = 3.05, HFOV = 14.6 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.330 |  |  |  |  |
| 2 | Lens 1 | 3.610 | (ASP) | 1.800 | Plastic | 1.545 | 56.1 | 4.57 |
| 3 |  | −6.635 | (ASP) | 0.104 |  |  |  |  |
| 4 | Lens 2 | −3.570 | (ASP) | 0.400 | Plastic | 1.601 | 29.4 | −3.58 |
| 5 |  | 5.617 | (ASP) | 0.374 |  |  |  |  |
| 6 | Lens 3 | 3.113 | (ASP) | 1.769 | Plastic | 1.567 | 40.2 | 10.69 |
| 7 |  | 5.083 | (ASP) | 0.050 |  |  |  |  |
| 8 | Lens 4 | 4.346 | (ASP) | 0.929 | Plastic | 1.661 | 20.3 | 15.63 |
| 9 |  | 6.867 | (ASP) | 0.694 |  |  |  |  |
| 10 | Lens 5 | 18.672 | (ASP) | 0.485 | Plastic | 1.574 | 37.1 | −14.16 |
| 11 |  | 5.612 | (ASP) | 0.050 |  |  |  |  |
| 12 | Stop | Plano |  | 1.210 |  |  |  |  |
| 13 | Filter | Plano |  | 0.300 | Glass | 1.517 | 64.2 | — |
| 14 |  | Plano |  | 3.016 |  |  |  |  |
| 15 | Image | Plano |  | — |  |  |  |  |

Note:
Reference wavelength is 587.6 nm (d-line).
An effective radius of the stop 701 (Surface 12) is 1.800 mm.

TABLE 14

Aspheric Coefficients

| Surface # | 2 | 3 | 4 | 5 | 6 |
|---|---|---|---|---|---|
| k = | −6.6276E−01 | 6.9507E−01 | −1.0840E+00 | −8.8223E+01 | −5.0790E+00 |
| A4 = | −1.7332E−03 | 2.2509E−02 | 6.4024E−02 | 6.2819E−02 | −1.2803E−02 |
| A6 = | −1.0592E−04 | −1.3309E−02 | −5.4156E−02 | −1.0036E−01 | −8.3141E−03 |
| A8 = | −1.9814E−04 | −2.3458E−03 | 3.0476E−02 | 8.7460E−02 | 2.8663E−03 |
| A10 = | 2.1607E−05 | 3.4510E−03 | −1.1598E−02 | −4.5996E−02 | 2.9613E−03 |
| A12 = | −9.3697E−06 | −9.6909E−04 | 3.2678E−03 | 1.5800E−02 | −1.2205E−03 |
| A14 = | — | 8.8851E−05 | −5.9422E−04 | −3.0966E−03 | 1.2923E−04 |
| A16 = | — | — | 4.7615E−05 | 2.5221E−04 | — |

| Surface # | 7 | 8 | 9 | 10 | 11 |
|---|---|---|---|---|---|
| k = | 1.5635E+00 | 7.7367E−01 | 1.2783E+01 | −6.8774E+01 | −8.8209E+00 |
| A4 = | −4.6130E−02 | −4.2070E−02 | −3.0276E−02 | −1.3488E−01 | −1.0406E−01 |
| A6 = | 4.4900E−02 | 5.8539E−02 | 4.0139E−02 | 4.9365E−02 | 4.5678E−02 |
| A8 = | −4.2778E−02 | −4.4215E−02 | −1.6761E−02 | −8.2776E−03 | −1.5659E−02 |
| A10 = | 2.5724E−02 | 2.1060E−02 | 3.7524E−03 | −2.2998E−03 | 3.0159E−03 |
| A12 = | −7.4905E−03 | −5.5464E−03 | −1.0122E−03 | 8.6526E−04 | −2.4525E−04 |
| A14 = | 8.6649E−04 | 5.8052E−04 | 1.8844E−04 | — | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 11.20 | R5/R6 | 0.61 |
| Fno | 3.05 | (R7 − R8)/(R7 + R8) | −0.22 |
| HFOV [deg.] | 14.6 | f345/f12 | 0.0032 |
| V3 + V5 | 77.3 | f/f1 | 2.45 |
| T12/T23 | 0.28 | |P1| + |P2| | 5.58 |
| T34/T23 | 0.13 | (|P3| + |P4| + |P5|)/ | 0.46 |
| | | (|P1| + |P2|) | |
| T12/CT4 | 0.11 | tan(HFOV) | 0.26 |
| T45/BL | 0.15 | SD/TD | 0.95 |
| CT2/CT4 | 0.43 | Y52/Y11 | 0.95 |
| (CT2 + T34)/T23 | 1.20 | Yc52/CT2 | 1.88 |
| (T34/T45) + (T45/CT4) | 0.82 | TL/f | 1.00 |
| (CT3 + CT4)/(CT2 + CT5) | 3.05 | TL/ImgH | 3.81 |

8th Embodiment

Figure 15:
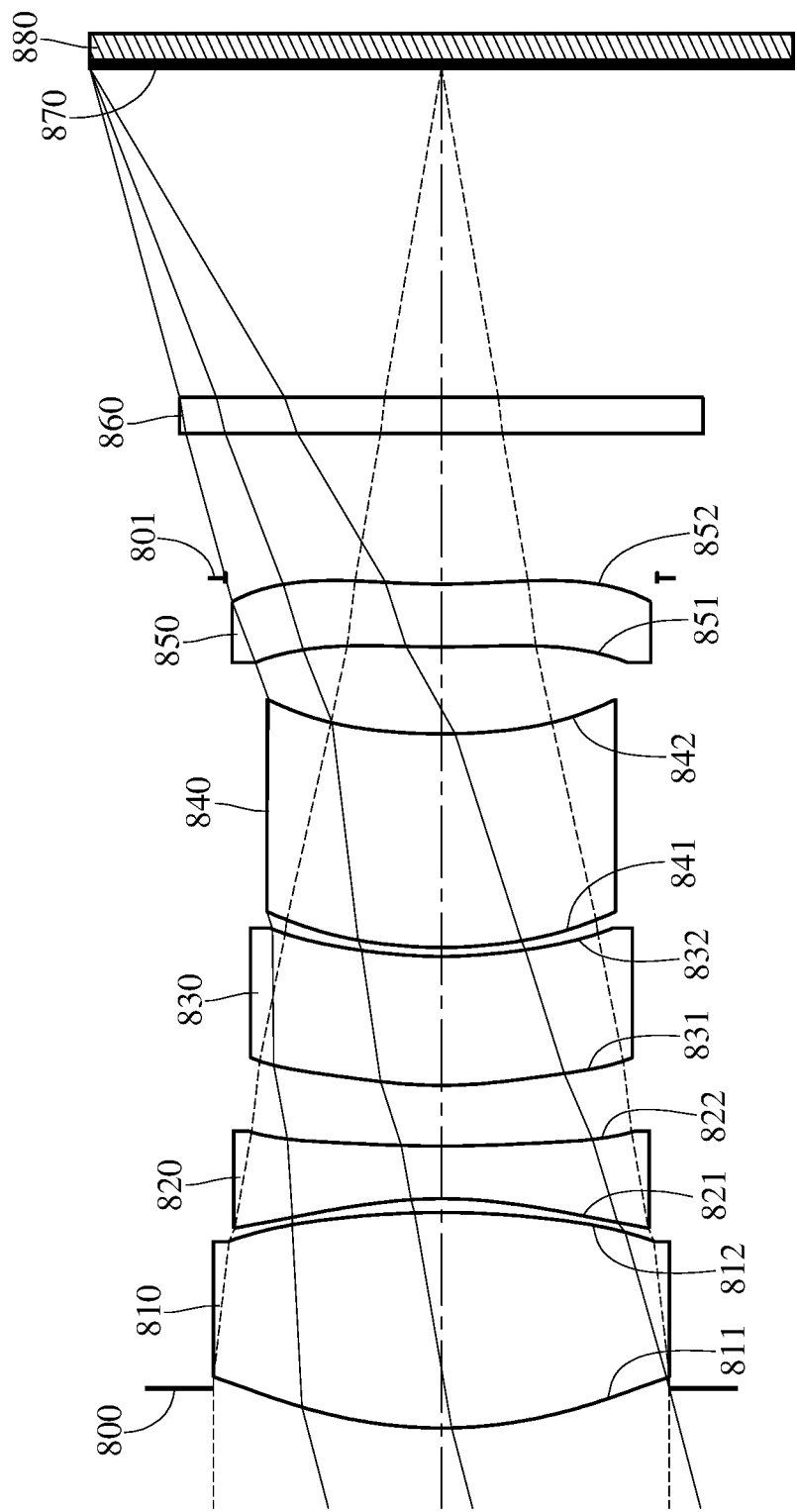
FIG. 15 is a schematic view of an image capturing unit according to the 8th embodiment of the present disclosure.
Figure 16:
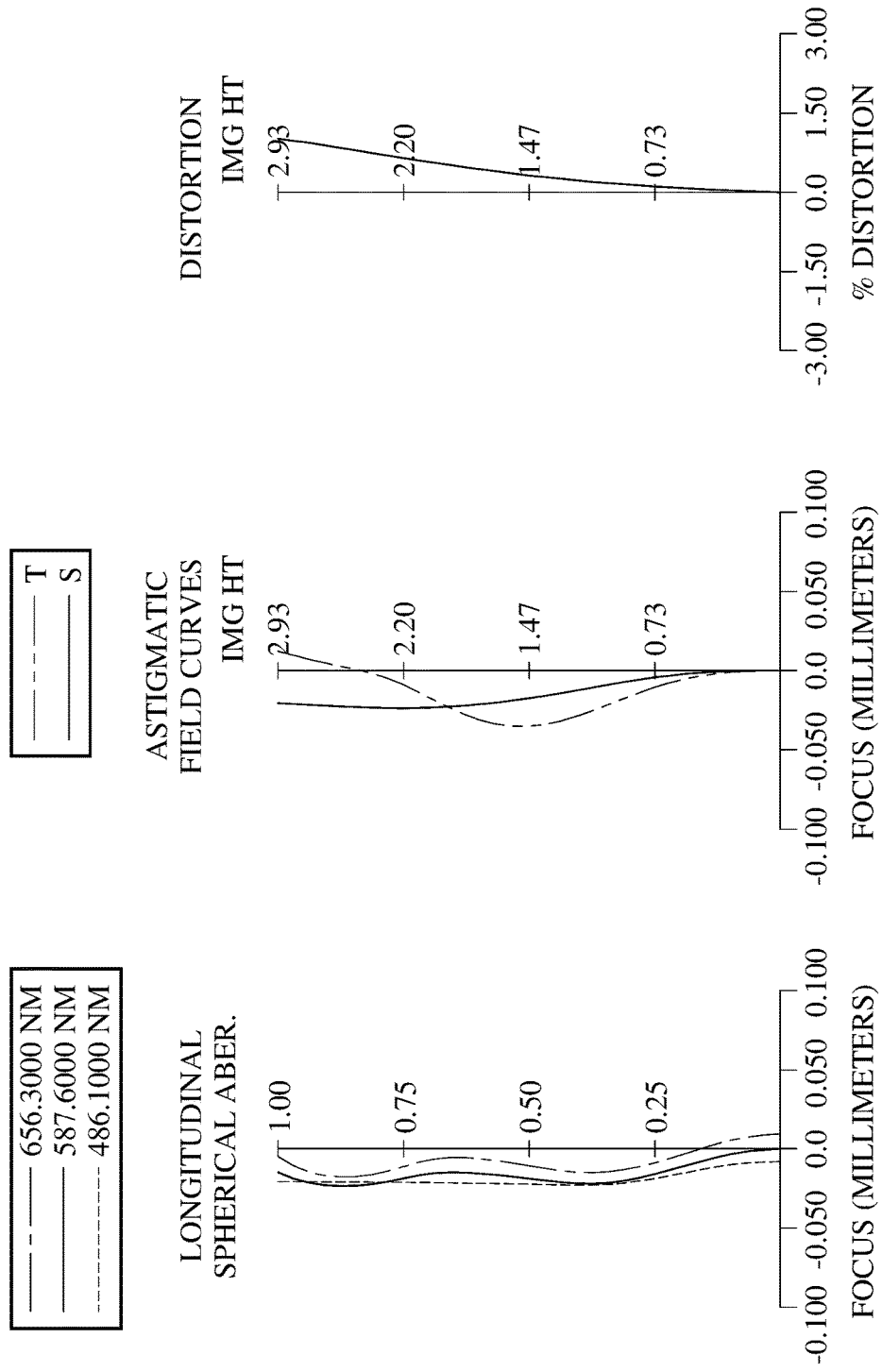
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens system (its reference numeral is omitted) of the present disclosure and an image sensor 880. The photographing lens system includes, in order from an object side to an image side, an aperture stop 800, a first lens element 810, a second lens element 820, a third lens element 830, a fourth lens element 840, a fifth lens element 850, a stop 801, a filter 860 and an image surface 870. The photographing lens system includes five single and non-cemented lens elements (810, 820, 830, 840 and 850) with no additional lens element disposed between the first lens element 810 and the fifth lens element 850. There is an air gap in a paraxial region between each adjacent lens element of the photographing lens system.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has one inflection point.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has three inflection points.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has one inflection point. The image-side surface 852 of the fifth lens element 850 has one inflection point.

The filter 860 is made of glass and located between the fifth lens element 850 and the image surface 870, and will not affect the focal length of the photographing lens system. The image sensor 880 is disposed on or near the image surface 870 of the photographing lens system.

In this embodiment, among the five lens elements, there are four lens elements each have an Abbe number less than 45.0. In detail, the Abbe numbers of the second lens element 820, the third lens element 830, the fourth lens element 840 and the fifth lens element 850 are all less than 45.0.

The detailed optical data of the 8th embodiment are shown in Table 15 and the aspheric surface data are shown in Table 16 below.

TABLE 15

8th Embodiment
f = 11.21 mm, Fno = 2.95, HFOV = 14.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.330 | | | | |
| 2 | Lens 1 | 3.811 | (ASP) | 1.800 | Plastic | 1.545 | 56.1 | 4.81 |
| 3 | | −7.011 | (ASP) | 0.115 | | | | |
| 4 | Lens 2 | −3.696 | (ASP) | 0.440 | Plastic | 1.614 | 26.0 | −4.38 |
| 5 | | 10.334 | (ASP) | 0.506 | | | | |
| 6 | Lens 3 | 3.626 | (ASP) | 1.077 | Plastic | 1.614 | 26.0 | 42.60 |
| 7 | | 3.735 | (ASP) | 0.075 | | | | |
| 8 | Lens 4 | 3.801 | (ASP) | 1.784 | Plastic | 1.661 | 20.3 | 14.47 |
| 9 | | 5.132 | (ASP) | 0.726 | | | | |
| 10 | Lens 5 | 9.369 | (ASP) | 0.524 | Plastic | 1.566 | 37.4 | −29.16 |
| 11 | | 5.856 | (ASP) | 0.050 | | | | |
| 12 | Stop | Plano | | 1.210 | | | | |
| 13 | Filter | Plano | | 0.300 | Glass | 1.517 | 64.2 | — |
| 14 | | Plano | | 2.747 | | | | |
| 15 | Image | Plano | | — | | | | |

Note:
Reference wavelength is 587.6 nm (d-line).
An effective radius of the stop 801 (Surface 12) is 1.800 mm.

TABLE 16

Aspheric Coefficients

| Surface # | 2 | 3 | 4 | 5 | 6 |
|---|---|---|---|---|---|
| k = | −6.5123E−01 | −1.1905E+00 | −1.1719E+00 | −7.7073E+01 | −6.7722E+00 |
| A4 = | −2.3531E−03 | 5.8572E−03 | 3.5891E−02 | −6.8504E−03 | −3.8689E−02 |
| A6 = | 3.4345E−04 | 8.4286E−03 | −1.1461E−02 | −1.0530E−02 | 4.3503E−03 |
| A8 = | −3.2267E−04 | −1.3639E−02 | 9.8496E−04 | 1.7190E−02 | 7.0770E−03 |
| A10 = | 3.5902E−05 | 6.5980E−03 | 5.1384E−04 | −9.7951E−03 | −1.8561E−03 |

TABLE 16-continued

| Aspheric Coefficients | | | | | |
|---|---|---|---|---|---|
| A12 = | −4.9922E−06 | −1.4603E−03 | 1.9743E−04 | 3.8482E−03 | 6.0843E−05 |
| A14 = | — | 1.2471E−04 | −1.6798E−04 | −9.2099E−04 | 1.4940E−05 |
| A16 = | — | — | 2.4452E−05 | 9.1179E−05 | — |

| Surface # | 7 | 8 | 9 | 10 | 11 |
|---|---|---|---|---|---|
| k = | 1.1985E+00 | 1.2886E+00 | 6.4088E+00 | 1.2888E+01 | −5.9649E+00 |
| A4 = | −8.2139E−02 | −4.5232E−02 | −2.2628E−03 | −8.3814E−02 | −7.2257E−02 |
| A6 = | 9.6271E−02 | 8.3593E−02 | 2.2528E−02 | 3.1371E−02 | 2.5316E−02 |
| A8 = | −6.5228E−02 | −6.3418E−02 | −1.4150E−02 | −9.5718E−03 | −8.6335E−03 |
| A10 = | 2.4708E−02 | 2.4080E−02 | 3.7677E−03 | 1.2679E−03 | 1.6887E−03 |
| A12 = | −4.5176E−03 | −4.6173E−03 | −5.4794E−04 | −3.2862E−05 | −1.6135E−04 |
| A14 = | 3.0406E−04 | 3.5019E−04 | 4.4442E−05 | — | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 11.21 | R5/R6 | 0.97 |
| Fno | 2.95 | (R7 − R8)/(R7 + R8) | −0.15 |
| HFOV [deg.] | 14.6 | f345/f12 | 0.38 |
| V3 + V5 | 63.4 | f/f1 | 2.33 |
| T12/T23 | 0.23 | |P1| + |P2| | 4.89 |
| T34/T23 | 0.15 | (|P3| + |P4| + |P5|)/(|P1| + |P2|) | 0.29 |
| T12/CT4 | 0.06 | tan(HFOV) | 0.26 |
| T45/BL | 0.17 | SD/TD | 0.95 |
| CT2/CT4 | 0.25 | Y52/Y11 | 0.92 |
| (CT2 + T34)/T23 | 1.02 | Yc52/CT2 | 2.02 |
| (T34/T45) + (T45/CT4) | 0.51 | TL/f | 1.01 |
| (CT3 + CT4)/(CT2 + CT5) | 2.97 | TL/ImgH | 3.87 |

9th Embodiment

Figure 17:
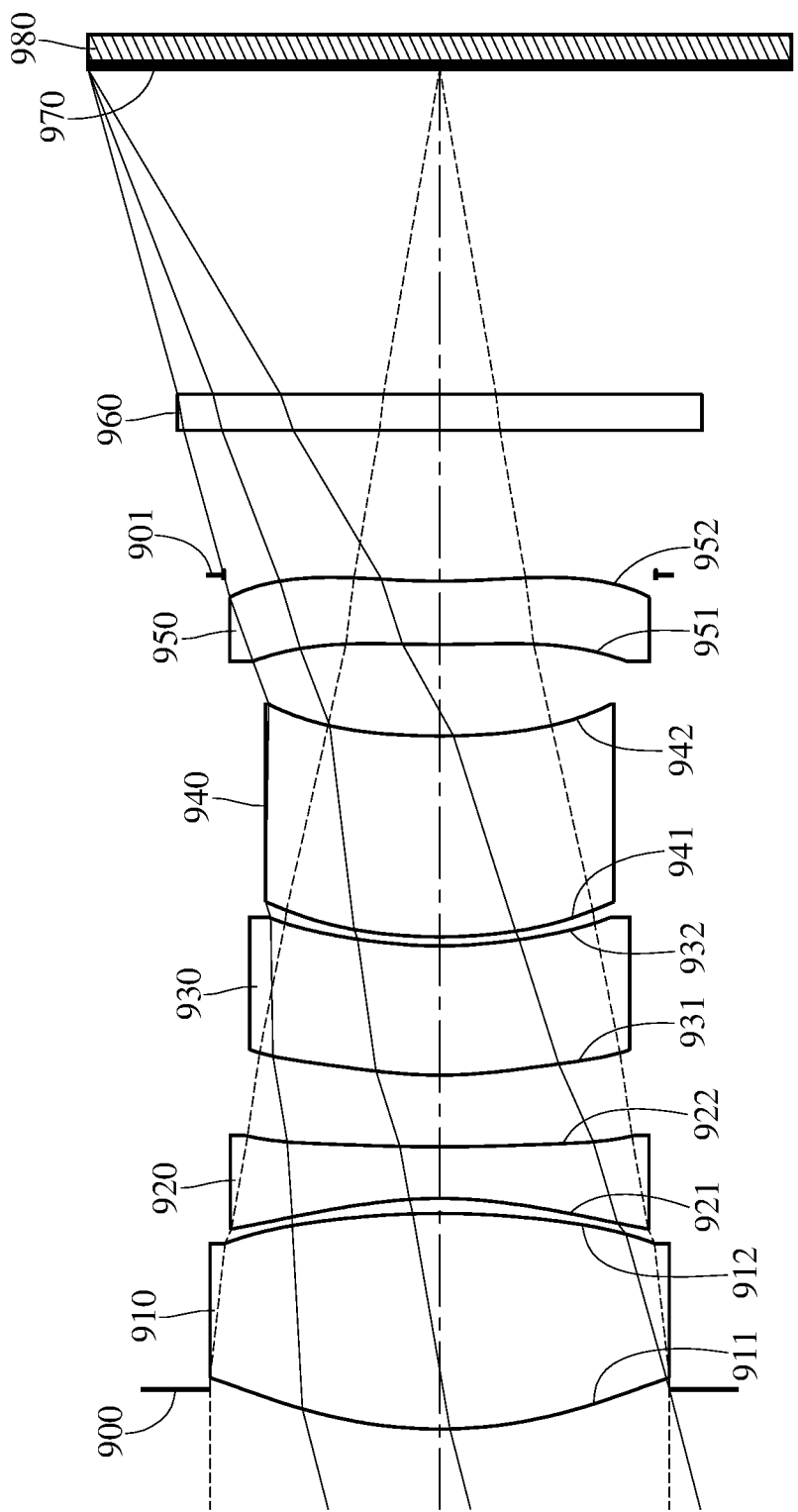
FIG. 17 is a schematic view of an image capturing unit according to the 9th embodiment of the present disclosure.
Figure 18:
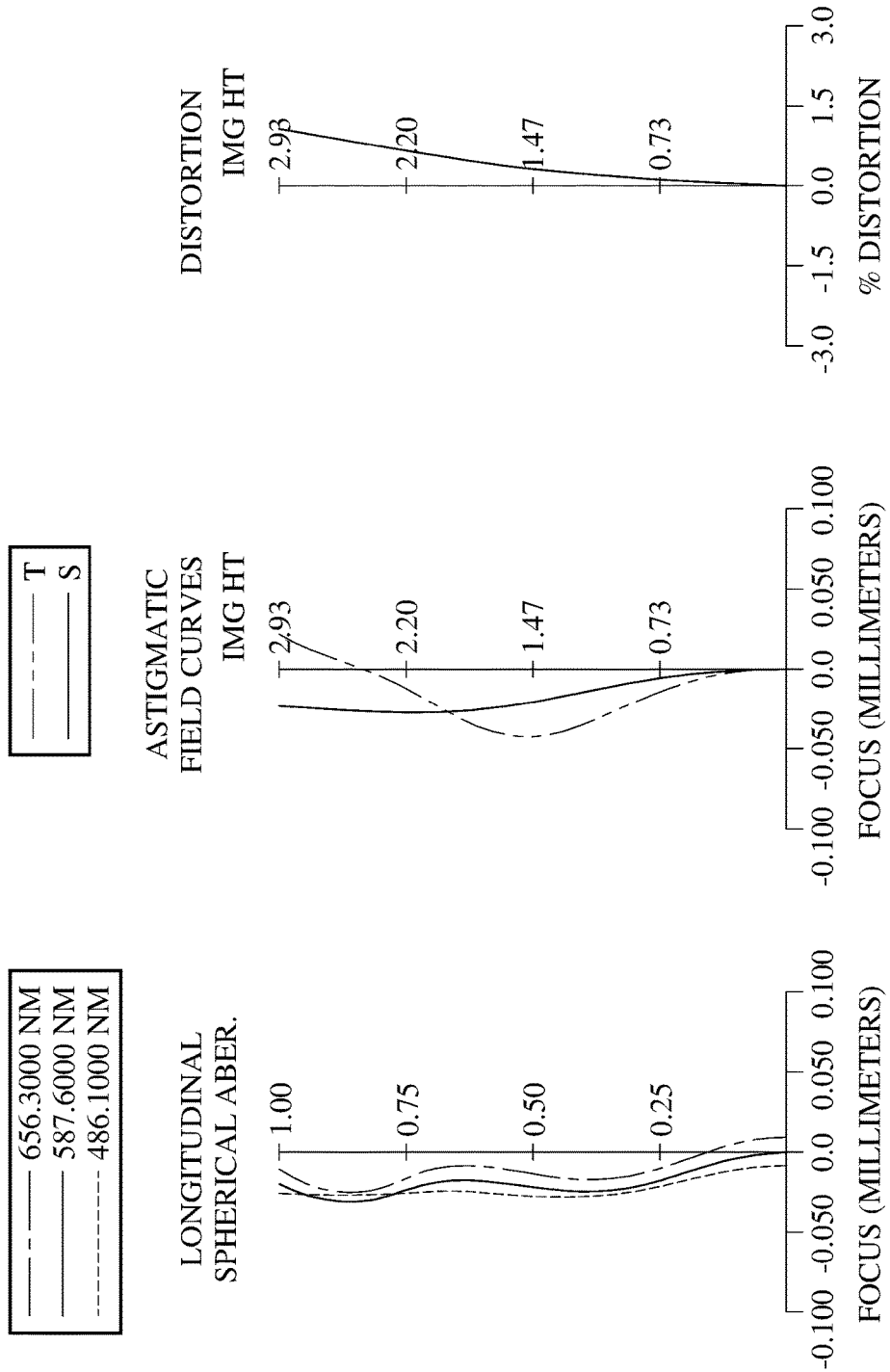
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens system (its reference numeral is omitted) of the present disclosure and an image sensor 980. The photographing lens system includes, in order from an object side to an image side, an aperture stop 900, a first lens element 910, a second lens element 920, a third lens element 930, a fourth lens element 940, a fifth lens element 950, a stop 901, a filter 960 and an image surface 970. The photographing lens system includes five single and non-cemented lens elements (910, 920, 930, 940 and 950) with no additional lens element disposed between the first lens element 910 and the fifth lens element 950. There is an air gap in a paraxial region between each adjacent lens element of the photographing lens system.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric. The object-side surface 911 of the first lens element 910 has one inflection point.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has one inflection point.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has one inflection point. The image-side surface 952 of the fifth lens element 950 has one inflection point.

The filter 960 is made of glass and located between the fifth lens element 950 and the image surface 970, and will not affect the focal length of the photographing lens system. The image sensor 980 is disposed on or near the image surface 970 of the photographing lens system.

In this embodiment, among the five lens elements, there are four lens elements each have an Abbe number less than 45.0. In detail, the Abbe numbers of the second lens element 920, the third lens element 930, the fourth lens element 940 and the fifth lens element 950 are all less than 45.0.

The detailed optical data of the 9th embodiment are shown in Table 17 and the aspheric surface data are shown in Table 18 below.

TABLE 17

9th Embodiment
f = 11.30 mm, Fno = 2.95, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.330 | | | | |
| 2 | Lens 1 | 3.857 | (ASP) | 1.800 | Plastic | 1.545 | 56.1 | 4.84 |
| 3 | | −6.959 | (ASP) | 0.125 | | | | |
| 4 | Lens 2 | −3.723 | (ASP) | 0.431 | Plastic | 1.614 | 26.0 | −4.74 |
| 5 | | 13.941 | (ASP) | 0.598 | | | | |
| 6 | Lens 3 | 3.719 | (ASP) | 1.079 | Plastic | 1.614 | 26.0 | 87.13 |
| 7 | | 3.556 | (ASP) | 0.076 | | | | |
| 8 | Lens 4 | 4.029 | (ASP) | 1.677 | Plastic | 1.661 | 20.3 | 14.10 |
| 9 | | 5.926 | (ASP) | 0.764 | | | | |
| 10 | Lens 5 | 11.277 | (ASP) | 0.528 | Plastic | 1.566 | 37.4 | −22.09 |
| 11 | | 5.828 | (ASP) | 0.050 | | | | |
| 12 | Stop | Plano | | 1.210 | | | | |
| 13 | Filter | Plano | | 0.300 | Glass | 1.517 | 64.2 | — |
| 14 | | Plano | | 2.712 | | | | |
| 15 | Image | Plano | | — | | | | |

Note:
Reference wavelength is 587.6 nm (d-line).
An effective radius of the stop 901 (Surface 12) is 1.800 mm.

TABLE 18

Aspheric Coefficients

| Surface # | 2 | 3 | 4 | 5 | 6 |
|---|---|---|---|---|---|
| k = | −6.1874E−01 | −1.7051E+00 | −9.8681E−01 | −3.8404E+01 | −5.6184E+00 |
| A4 = | −2.2706E−03 | 5.1709E−03 | 3.4599E−02 | −7.5274E−03 | −3.8280E−02 |
| A6 = | 3.3389E−04 | 8.2540E−03 | −1.1548E−02 | −1.1287E−02 | 3.1215E−03 |
| A8 = | −3.1003E−04 | −1.3536E−02 | 8.9157E−04 | 1.7131E−02 | 6.6552E−03 |
| A10 = | 3.6329E−05 | 6.6084E−03 | 5.8151E−04 | −9.9371E−03 | −1.7453E−03 |
| A12 = | −5.3650E−06 | −1.4578E−03 | 2.1689E−04 | 3.8437E−03 | 8.3843E−05 |
| A14 = | — | 1.2285E−04 | −1.7507E−04 | −8.7614E−04 | 9.4689E−06 |
| A16 = | — | — | 2.4566E−05 | 8.2591E−05 | — |

| Surface # | 7 | 8 | 9 | 10 | 11 |
|---|---|---|---|---|---|
| k = | 7.4652E−01 | 1.8031E+00 | 8.2403E+00 | 1.1034E+01 | −4.0430E+00 |
| A4 = | −8.4431E−02 | −4.3242E−02 | 2.3890E−03 | −8.0581E−02 | −7.2555E−02 |
| A6 = | 9.6087E−02 | 8.4075E−02 | 2.2896E−02 | 3.1185E−02 | 2.5699E−02 |
| A8 = | −6.4819E−02 | −6.3610E−02 | −1.4462E−02 | −9.5859E−03 | −8.7997E−03 |
| A10 = | 2.4631E−02 | 2.4084E−02 | 3.9527E−03 | 1.1679E−03 | 1.7197E−03 |
| A12 = | −4.5747E−03 | −4.6116E−03 | −5.5481E−04 | 3.9814E−05 | −1.5456E−04 |
| A14 = | 3.2142E−04 | 3.5280E−04 | 5.0639E−05 | — | — |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 11.30 | R5/R6 | 1.05 |
| Fno | 2.95 | (R7 − R8)/(R7 + R8) | −0.19 |
| HFOV [deg.] | 14.5 | f345/f12 | 0.80 |
| V3 + V5 | 63.4 | f/f1 | 2.34 |
| T12/T23 | 0.21 | |P1| + |P2| | 4.72 |
| T34/T23 | 0.13 | (|P3| + |P4| + |P5|)/ | 0.31 |

-continued

| 9th Embodiment | | | |
|---|---|---|---|
| | | (|P1| + |P2|) | |
| T12/CT4 | 0.07 | tan(HFOV) | 0.26 |
| T45/BL | 0.18 | SD/TD | 0.95 |
| CT2/CT4 | 0.26 | Y52/Y11 | 0.91 |
| (CT2 + T34)/T23 | 0.85 | Yc52/CT2 | 2.10 |
| (T34/T45) + (T45/CT4) | 0.56 | TL/f | 1.00 |
| (CT3 + CT4)/(CT2 + CT5) | 2.87 | TL/ImgH | 3.87 |

10th Embodiment

Figure 19:
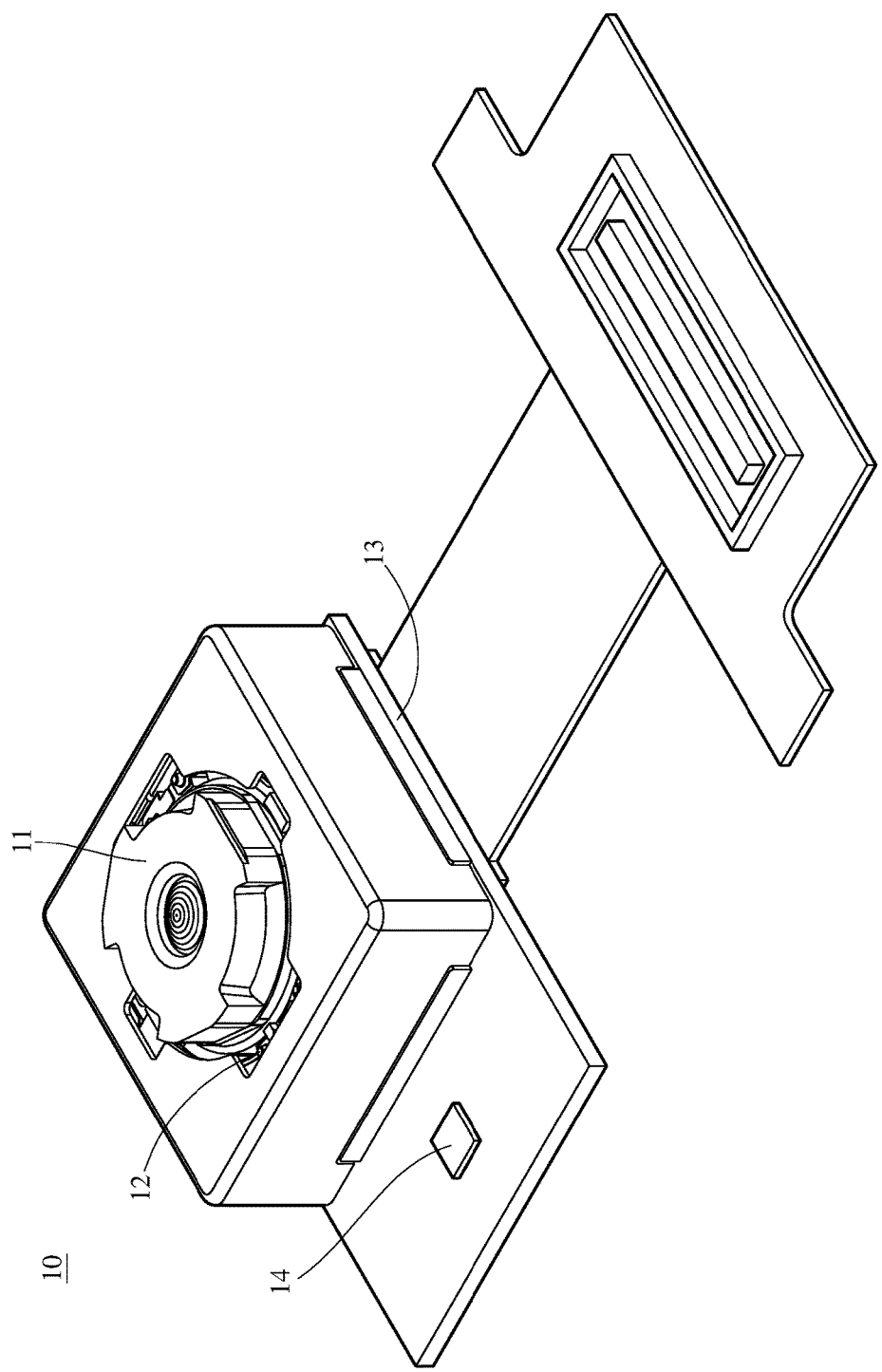
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 10 is a camera module including a lens unit 11, a driving device 12, an image sensor 13 and an image stabilizer 14. The lens unit 11 includes the photographing lens system disclosed in the 1st embodiment, a barrel and a holder member (their reference numerals are omitted) for holding the photographing lens system. The imaging light converges into the lens unit 11 of the image capturing unit 10 to generate an image with the driving device 12 utilized for image focusing on the image sensor 13, and the generated image is then digitally transmitted to other component for further processing.

The driving device 12 can have auto focusing functionality, and different driving configurations can be through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS) can feature high photosensitivity and low noise, disposed on the image surface of the photographing lens system to provide higher image quality.

The image stabilizer 14, such as an accelerometer, a gyroscope and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the driving device 12 can be can be assisted by electronic image stabilization (EIS) with image processing software, thereby improving image quality while in motion or low-light conditions.

11th Embodiment

Figure 20:
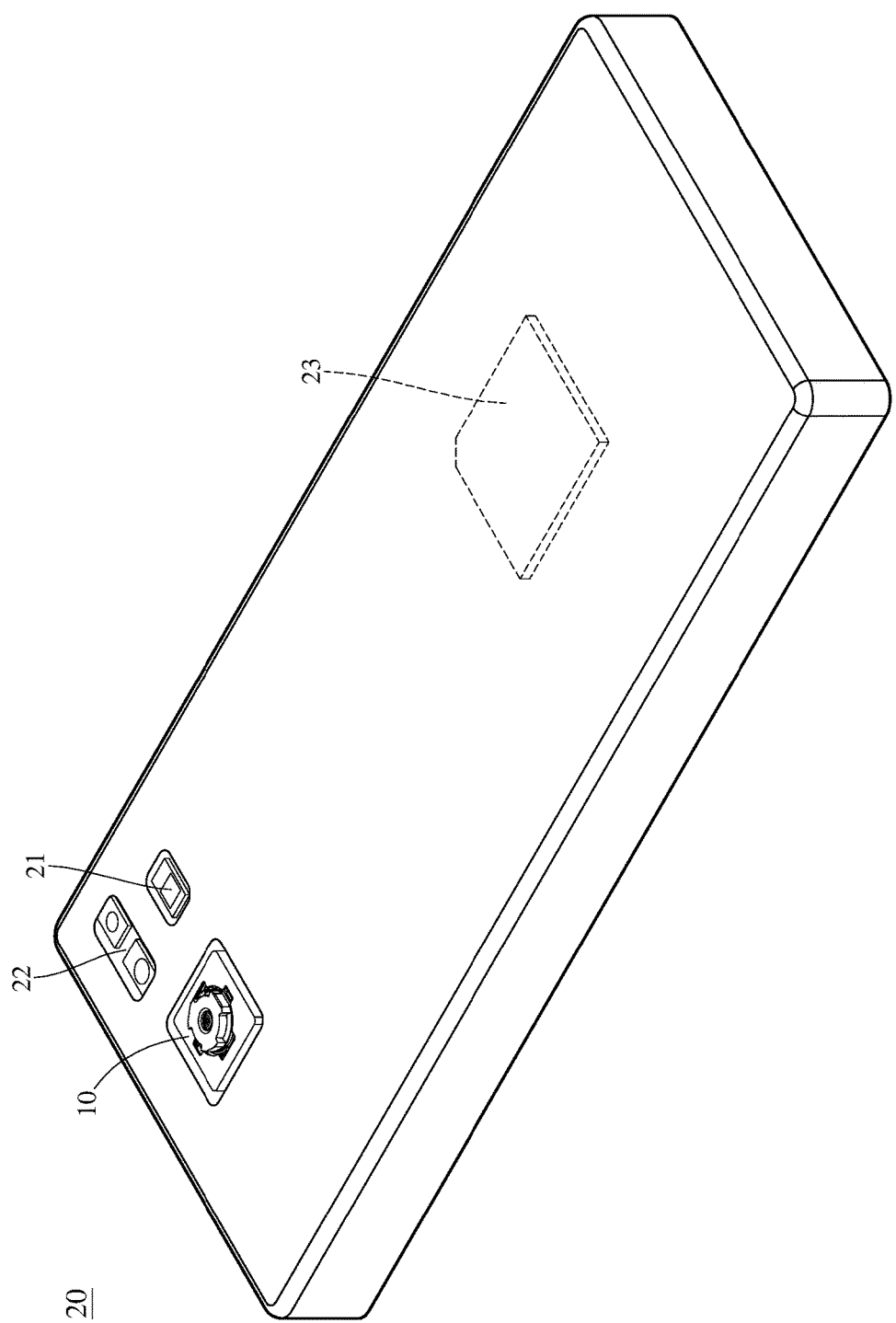
FIG. 20 is one perspective view of an electronic device according to the 11th embodiment of the present disclosure.
Figure 21:
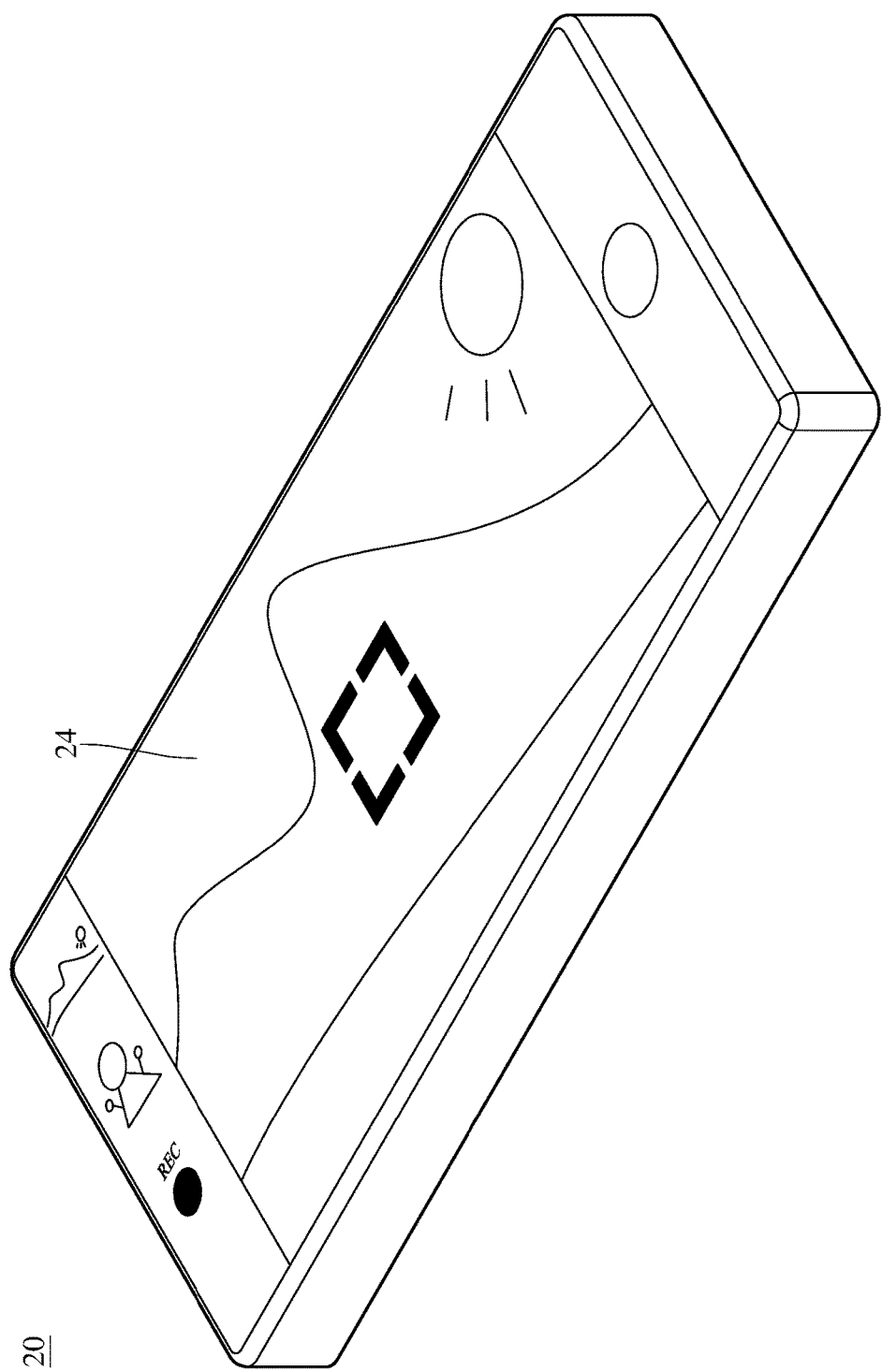
FIG. 21 is another perspective view of the electronic device in FIG. 20.
Figure 22:
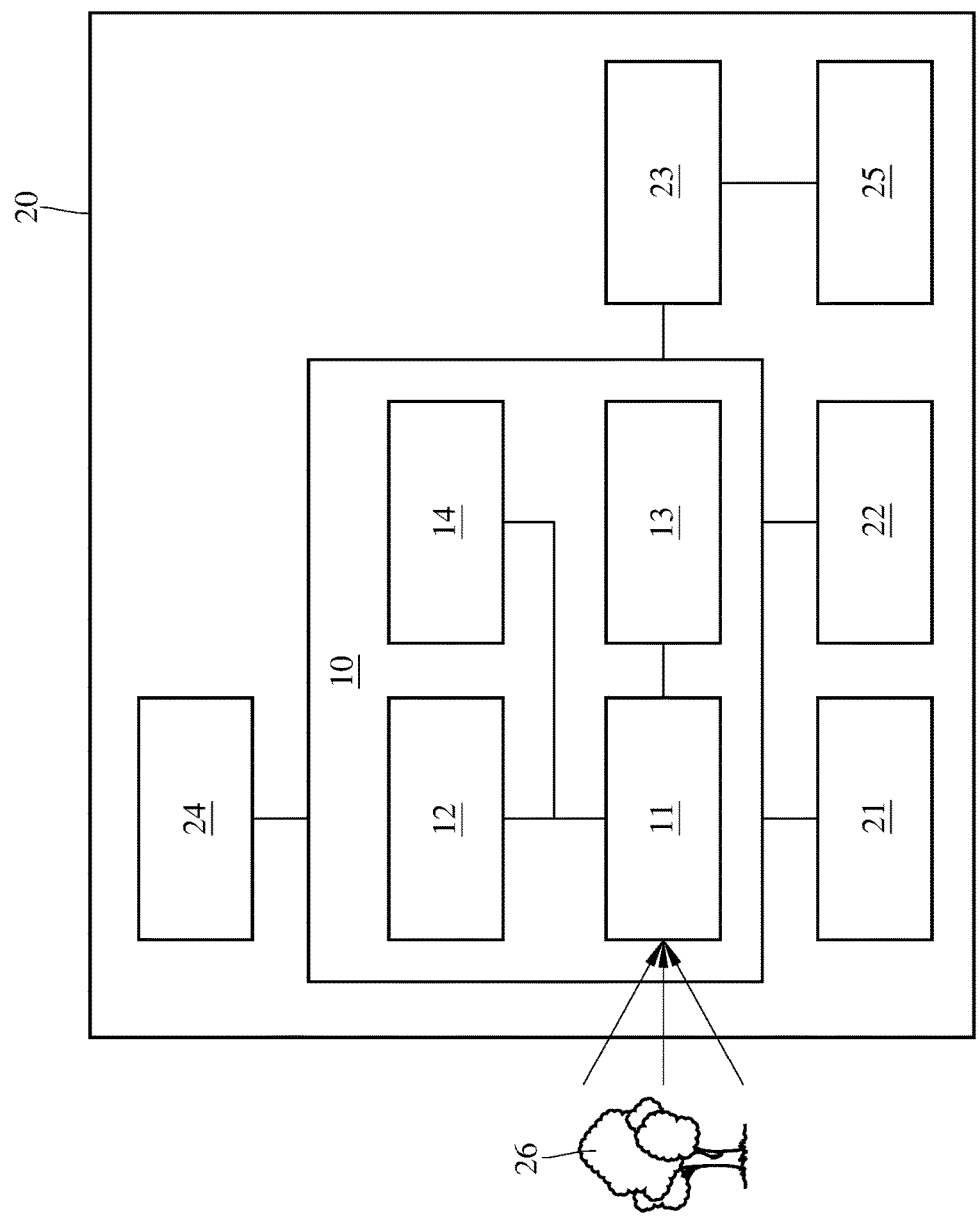
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20. In this embodiment, an electronic device 20 is a smartphone including the image capturing unit 10 disclosed in the tenth embodiment, a flash module 21, a focus assist module 22, an image signal processor 23, an user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user interacts with the user interface 24 to capture the images of an object 26, the light rays converge in the image capturing unit 10 to generate an image, and the flash module 21 is activated for light supplement. The focus assist module 22 detects the object distance of the imaged object to achieve fast image auto focus. The image signal processor 23 is configured to optimize the captured image to improve image quality. The light beam emitted from the focus assist module 22 can be either conventional infrared light or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising five lens elements, the five lens elements being, in order from an object side to an image side:
   a first lens element having positive refractive power;
   a second lens element;
   a third lens element having an object-side surface being convex in a paraxial region thereof;
   a fourth lens element having an object-side surface being convex in a paraxial region thereof; and
   a fifth lens element;
   wherein a refractive power of the first lens element is P1, a refractive power of the second lens element is P2, a refractive power of the third lens element is P3, a refractive power of the fourth lens element is P4, a refractive power of the fifth lens element is P5, an axial distance between the second lens element and the third lens element is T23, an axial distance between the third lens element and the fourth lens element is T34, an axial distance between the fourth lens element and the fifth lens element is T45, a central thickness of the second lens element is CT2, a central thickness of the fourth lens element is CT4, and the following conditions are satisfied:

$$(|P3|+|P4|+|P5|)/(|P1|+|P2|)<0.60;$$

$$3.50<|P1|+|P2|<8.50;$$

$$0.20<(T34/T45)+(T45/CT4)<1.50; \text{ and}$$

$$0.10<(CT2+T34)/T23<9.0.$$

2. The photographing lens system of claim 1, wherein the second lens element has negative refractive power, and the second lens element has an object-side surface being concave in a paraxial region thereof.

3. The photographing lens system of claim 1, wherein a curvature radius of the object-side surface of the third lens element is R5, a curvature radius of an image-side surface of the third lens element is R6, and the following condition is satisfied:

$$0.10<R5/R6<1.50.$$

4. The photographing lens system of claim 1, wherein a curvature radius of the object-side surface of the fourth lens element is R7, a curvature radius of an image-side surface of the fourth lens element is R8, and the following condition is satisfied:

$$-0.45 < (R7-R8)/(R7+R8) < 1.0.$$

5. The photographing lens system of claim 1, wherein an Abbe number of the third lens element is V3, an Abbe number of the fifth lens element is V5, and the following condition is satisfied:

$$20.0 < V3+V5 < 78.0.$$

6. The photographing lens system of claim 1, further comprising an aperture stop disposed between an imaged object and an object-side surface of the second lens element, wherein an axial distance between the aperture stop and an image-side surface of the fifth lens element is SD, an axial distance between an object-side surface of the first lens element and an image-side surface of the fifth lens element is TD, and the following condition is satisfied:

$$0.75 < SD/TD < 1.20.$$

7. The photographing lens system of claim 1, wherein an axial distance between the first lens element and the second lens element is T12, the central thickness of the fourth lens element is CT4, an axial distance between an object-side surface of the first lens element and an image surface is TL, a maximum image height of the photographing lens system is ImgH, and the following conditions are satisfied:

$$0 < T12/CT4 < 0.50; \text{ and}$$

$$2.50 < TL/ImgH < 4.50.$$

8. The photographing lens system of claim 1, wherein a composite focal length of the first lens element and the second lens element is f12, a composite focal length of the third lens element, the fourth lens element and the fifth lens element is f345, and the following condition is satisfied:

$$0 < f345/f12 < 1.80.$$

9. The photographing lens system of claim 1, wherein a focal length of the photographing lens system is f, a focal length of the first lens element is f1, an axial distance between an object-side surface of the first lens element and an image surface is TL, and the following conditions are satisfied:

$$1.80 < f/f1 < 3.50; \text{ and}$$

$$0.50 < TL/f < 1.15.$$

10. The photographing lens system of claim 1, wherein a vertical distance between a critical point on an image-side surface of the fifth lens element and an optical axis is Yc52, the central thickness of the second lens element is CT2, and the following condition is satisfied:

$$0.20 < Yc52/CT2 < 7.50.$$

11. The photographing lens system of claim 1, wherein each of at least three of the five lens elements has an Abbe number less than 45.0, half of a maximum field of view of the photographing lens system is HFOV, and the following condition is satisfied:

$$0.15 < \tan(HFOV) < 0.35.$$

12. The photographing lens system of claim 1, wherein a maximum effective radius of an object-side surface of the first lens element is Y11, a maximum effective radius of an image-side surface of the fifth lens element is Y52, and the following condition is satisfied:

$$0.50 < Y52/Y11 < 1.10.$$

13. A photographing lens system comprising five lens elements, the five lens elements being, in order from an object side to an image side:
a first lens element having positive refractive power;
a second lens element;
a third lens element having an object-side surface being convex in a paraxial region thereof;
a fourth lens element having an object-side surface being convex in a paraxial region thereof; and
a fifth lens element having an image-side surface being concave in a paraxial region thereof;
wherein at least one of the five lens elements has at least one inflection point, a refractive power of the first lens element is P1, a refractive power of the second lens element is P2, a refractive power of the third lens element is P3, a refractive power of the fourth lens element is P4, a refractive power of the fifth lens element is P5, a central thickness of the second lens element is CT2, a central thickness of the fourth lens element is CT4, and the following conditions are satisfied:

$$(|P3|+|P4|+|P5|)/(|P1|+|P2|)<0.80;$$

$$3.50<|P1|+|P2|<8.50; \text{ and}$$

$$0.03<CT2/CT4<0.58.$$

14. The photographing lens system of claim 13, wherein there is an air gap in a paraxial region between each of the five adjacent lens elements of the photographing lens system, and the fourth lens element has an image-side surface being concave in a paraxial region thereof.

15. The photographing lens system of claim 13, wherein the third lens element has positive refractive power, and the third lens element has an image-side surface being concave in a paraxial region thereof.

16. The photographing lens system of claim 13, wherein the fourth lens element has positive refractive power, an axial distance between an object-side surface of the first lens element and an image surface is TL, a focal length of the photographing lens system is f, and the following condition is satisfied:

$$0.50<TL/f<1.15.$$

17. The photographing lens system of claim 13, wherein an axial distance between the first lens element and the second lens element is T12, an axial distance between the second lens element and the third lens element is T23, and the following condition is satisfied:

$$T12/T23<0.70.$$

18. The photographing lens system of claim 13, wherein a maximum effective radius of an object-side surface of the first lens element is Y11, a maximum effective radius of the image-side surface of the fifth lens element is Y52, and the following condition is satisfied:

$$0.50<Y52/Y11<1.10.$$

19. The photographing lens system of claim 13, wherein the refractive power of the first lens element is P1, the refractive power of the second lens element is P2, an axial distance between the fourth lens element and the fifth lens element is T45, an axial distance between the image-side surface of the fifth lens element and an image surface is BL, and the following conditions are satisfied:

$$4.0<|P1|+|P2|<7.50; \text{ and}$$

$$0.10<T45/BL<1.0.$$

20. The photographing lens system of claim 13, wherein the central thickness of the second lens element is CT2, a central thickness of the third lens element is CT3, the central thickness of the fourth lens element is CT4, a central thickness of the fifth lens element is CT5, half of a maximum field of view of the photographing lens system is HFOV, and the following conditions are satisfied:

$1.0<(CT3+CT4)/(CT2+CT5)<8.0$; and $0.15<\tan(HFOV)<0.35$.

21. The photographing lens system of claim 13, wherein each of at least three of the five lens elements has an Abbe number less than 45.0.

22. The photographing lens system of claim 13, wherein a vertical distance between a critical point on the image-side surface of the fifth lens element and an optical axis is Yc52, the central thickness of the second lens element is CT2, and the following condition is satisfied:

$0.20<Yc52/CT2<7.50$.

23. The photographing lens system of claim 13, wherein an axial distance between the second lens element and the third lens element is T23, an axial distance between the third lens element and the fourth lens element is T34, and the following condition is satisfied:

$T34/T23<0.30$.

24. An image capturing unit, comprising:
the photographing lens system of claim 13;
a prism disposed on the photographing lens system;
a driving device disposed on the photographing lens system; and
an image sensor disposed on an image surface of the photographing lens system.

25. An electronic device, comprising:
the image capturing unit of claim 24.

26. A photographing lens system comprising five lens elements, the five lens elements being, in order from an object side to an image side:
a first lens element having positive refractive power;
a second lens element;
a third lens element having an object-side surface being convex in a paraxial region thereof and an image-side surface being concave in a paraxial region thereof;
a fourth lens element having positive refractive power; and
a fifth lens element;
wherein at least one of the five lens elements has at least one inflection point, a maximum effective radius of an object-side surface of the first lens element is Y11, a maximum effective radius of an image-side surface of the fifth lens element is Y52, a refractive power of the first lens element is P1, a refractive power of the second lens element is P2, a refractive power of the third lens element is P3, a refractive power of the fourth lens element is P4, a refractive power of the fifth lens element is P5, a central thickness of the second lens element is CT2, a central thickness of the third lens element is CT3, a central thickness of the fourth lens element is CT4, a central thickness of the fifth lens element is CT5, and the following conditions are satisfied:

$0.50<Y52/Y11<1.10$;

$(|P3|+|P4|+|P5|)/(|P1|+|P2|)<0.60$; and $1.80<(CT3+CT4)/(CT2+CT5)<7.0$.

27. The photographing lens system of claim 26, wherein the second lens element has an object-side surface being concave in a paraxial region thereof, an axial distance between the second lens element and the third lens element is T23, an axial distance between the third lens element and the fourth lens element is T34, and the following condition is satisfied:

$T34/T23<1.0$.

28. The photographing lens system of claim 26, wherein an axial distance between the third lens element and the fourth lens element is T34, an axial distance between the fourth lens element and the fifth lens element is T45, the central thickness of the fourth lens element is CT4, and the following condition is satisfied:

$0.20<(T34/T45)+(T45/CT4)<1.5$.

29. The photographing lens system of claim 26, wherein half of a maximum field of view of the photographing lens system is HFOV, an axial distance between the object-side surface of the first lens element and an image surface is TL, a maximum image height of the photographing lens system is ImgH, and the following conditions are satisfied:

$0.15<\tan(HFOV)<0.35$; and $2.50<TL/ImgH<4.50$.

30. The photographing lens system of claim 26, wherein each of at least three of the five lens elements has an Abbe number less than 45.0.

* * * * *